(12) United States Patent
Lagadin et al.

(10) Patent No.: US 12,529,516 B2
(45) Date of Patent: Jan. 20, 2026

(54) INTEGRATED MULTI-FUNCTIONAL PIPELINE SYSTEM FOR DELIVERY OF CHILLED MIXTURES OF NATURAL GAS AND CHILLED MIXTURES OF NATURAL GAS AND NGLS

(71) Applicant: JL ENERGY TRANSPORTATION INC., Calgary (CA)

(72) Inventors: John Lagadin, Calgary (CA); Ian Morris, Calgary (CA)

(73) Assignee: JL Energy Transportation Inc., Calgary (CA)

( * ) Notice: Subject to any disclaimer, the term of this patent is extended or adjusted under 35 U.S.C. 154(b) by 0 days.

(21) Appl. No.: 18/057,938

(22) Filed: Nov. 22, 2022

(65) Prior Publication Data
US 2023/0085320 A1 Mar. 16, 2023

Related U.S. Application Data

(62) Division of application No. 15/607,653, filed on May 29, 2017, now abandoned.
(Continued)

(51) Int. Cl.
*F25J 1/00* (2006.01)
*F17D 1/08* (2006.01)
(Continued)

(52) U.S. Cl.
CPC .............. *F25J 1/0237* (2013.01); *F17D 1/08* (2013.01); *F17D 3/01* (2013.01); *F25J 1/0022* (2013.01);
(Continued)

(58) Field of Classification Search
CPC ........ F25J 1/0022; F25J 1/0202; F25J 1/0237; F25J 2230/30
See application file for complete search history.

(56) References Cited

U.S. PATENT DOCUMENTS 3,527,585 A 9/1970 Ungerleider
3,593,535 A 7/1971 Gaumer, Jr. et al.
(Continued)

FOREIGN PATENT DOCUMENTS

CA 2886720 10/2016
CN 100392052 6/2008
(Continued)

OTHER PUBLICATIONS

NIST Chemistry Webbook Isobaric Properties of Ethane at 814.7 PSIA https://webbook.nist.gov/cgi/fluid.cgi?P=814.7&TLow=-100&THigh=-20&TInc=10&Digits=5&ID=C74840&Action=Load&Type=IsoBar&TUnit=F&PUnit=psia&DUnit=mol%2Fl&HUnit=kJ%2Fmol&WUnit=m%2Fs&VisUnit=uPa*s&STUnit=N%2Fm&RefState=DEF (Year: 2023).*
(Continued)

*Primary Examiner* — Brian M King
(74) *Attorney, Agent, or Firm* — Parlee McLaws LLP

(57) ABSTRACT

Herein pipeline pressure, temperature and NGL constituents are manipulated for the transportation and optional storage in a pipeline system of natural gas mixtures or rich mixtures for delivery of chilled Products for downstream applications. Pressure reduction from a last compression section delivers internally chilled Products for reduced capital and operating costs. A high lift compressor station before the pipeline terminus provides pressure differential for Joule-Thompson chilling of the pipeline contents. The chilling step can be retrofitted to existing pipeline systems, and the chilling steep can include a turbo expander or the like for recovery of pipeline pressure energy for power generation. For like throughout, with this higher pressure operation, the effects of enhanced NGL content results in a reduction in diameter of the pipeline by at least one standard size. Substantial overall reduction in energy consumption and (Continued)

associated CO2 emissions is thereby achieved through integrated pipeline/processing applications.

12 Claims, 17 Drawing Sheets

Related U.S. Application Data

(60) Provisional application No. 62/436,317, filed on Dec. 19, 2016, provisional application No. 62/342,688, filed on May 27, 2016.

(51) Int. Cl.
 *F17D 3/01* (2006.01)
 *F25J 1/02* (2006.01)

(52) U.S. Cl.
 CPC .......... *F25J 1/0035* (2013.01); *F25J 1/0052* (2013.01); *F25J 1/0082* (2013.01); *F25J 1/0085* (2013.01); *F25J 1/0205* (2013.01); *F25J 1/0232* (2013.01); *F25J 1/0254* (2013.01); *F25J 2210/06* (2013.01); *F25J 2220/64* (2013.01); *F25J 2230/30* (2013.01)

(56) References Cited

U.S. PATENT DOCUMENTS

| | | | |
|---|---|---|---|
| 4,677,827 A | 7/1987 | Shenoy et al. | |
| 6,201,163 B1 | 3/2001 | Morris et al. | |
| 6,217,626 B1 | 4/2001 | Morris et al. | |
| 6,378,330 B1 | 4/2002 | Minta et al. | |
| 6,564,578 B1* | 5/2003 | Fischer-Calderon | ........................ F25J 1/0254 62/619 |
| 7,257,952 B2 | 8/2007 | Bishop et al. | |
| 7,418,822 B2 | 9/2008 | Perry | |
| 8,028,535 B2 | 10/2011 | Sikora | |
| 8,256,519 B2 | 9/2012 | Friedemann | |
| 9,033,035 B2 | 5/2015 | Nevison | |
| 9,033,178 B2 | 5/2015 | White | |
| 2002/0046547 A1* | 4/2002 | Bishop | ................... B63B 25/14 222/3 |
| 2006/0042273 A1 | 3/2006 | Morris et al. | |
| 2008/0163645 A1 | 7/2008 | Konishi et al. | |
| 2008/0209916 A1* | 9/2008 | White | ....................... F17C 5/06 62/48.1 |
| 2008/0209918 A1* | 9/2008 | White | .................. F17C 13/026 62/50.1 |
| 2009/0064713 A1* | 3/2009 | Buijs | ..................... F25J 1/0022 62/613 |
| 2010/0186445 A1 | 7/2010 | Minta et al. | |
| 2012/0036888 A1 | 2/2012 | Vandor | |
| 2012/0073441 A1* | 3/2012 | Mak | ....................... C10L 3/102 62/636 |
| 2013/0186133 A1* | 7/2013 | Ploeger | ..................... F25J 3/08 62/636 |
| 2015/0176891 A1 | 6/2015 | Sapper | |
| 2015/0219392 A1 | 8/2015 | Millar et al. | |
| 2017/0038139 A1 | 2/2017 | Turney et al. | |
| 2017/0167786 A1 | 6/2017 | Pierre, Jr. | |
| 2017/0241592 A1 | 8/2017 | Whiteman et al. | |
| 2018/0058753 A1 | 3/2018 | Mak et al. | |
| 2018/0231303 A1 | 8/2018 | Pierre, Jr. | |
| 2020/0386473 A1 | 12/2020 | Becker et al. | |
| 2021/0088274 A1* | 3/2021 | Liu | ....................... F25J 3/0209 |

FOREIGN PATENT DOCUMENTS

| | | |
|---|---|---|
| CN | 102762700 B | 11/2014 |
| WO | WO 2016057008 | 4/2016 |
| WO | 2017201630 A1 | 11/2017 |

OTHER PUBLICATIONS

NIST Chemistry Webbook Isobaric Properties of Ethane at 1214.7 PSIA https://webbook.nist.gov/cgi/fluid.cgi?P=1214.7&TLow=-100&THigh=-20&TInc=10&Digits=5&ID=C74840&Action=Load&Type=IsoBar&TUnit=F&PUnit=psia&DUnit=mol%2Fl&HUnit=kJ%2Fmol&WUnit=m%2Fs&VisUnit=uPa*s&STUnit=N%2Fm&RefState=DEF (Year: 2023).*
Ethane—Thermophysical Properties The Engineering ToolBox https://www.engineeringtoolbox.com/ethane-d_1417.html (Year: 2023).*
International Search Report (PCT/CA2017/050651) dated Aug. 24, 2017, 4 pages.
Written Opinion of the International Searching Authority (PCT/CA2017/050651) dated Aug. 3, 2017, 4 pages.

* cited by examiner

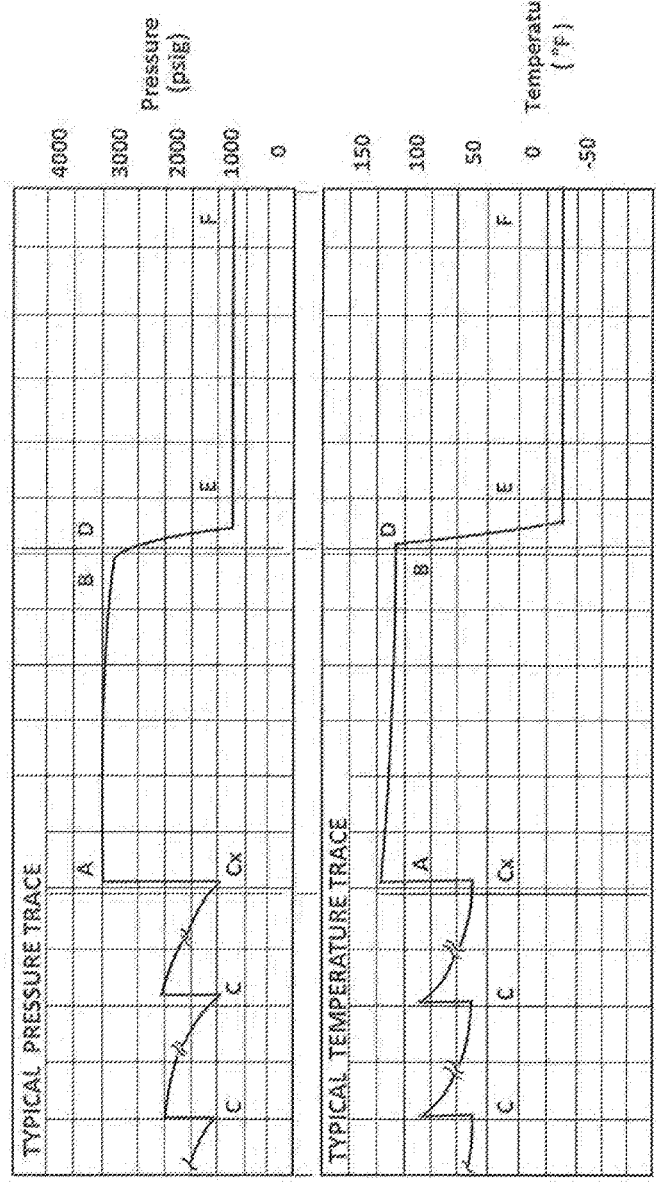
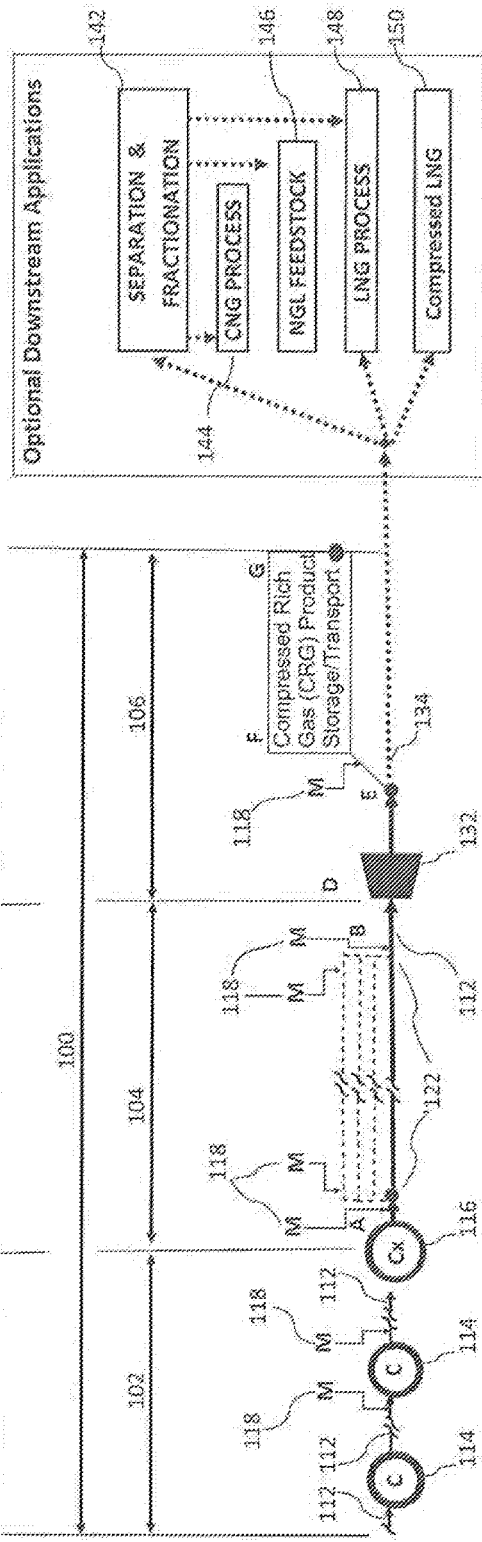

STD SPECIFICATION GAS - V/V Ratio, (MW= 17.3, SG = 0.59)
COMPRESSED STORAGE VOL / Std Condition VOL, (ft3/ft3)

| TEMP °F >> | -50 | -40 | -30 | -20 |
|---|---|---|---|---|
| PRESSURE (psig) | V/V (ft³/ft³) | V/V (ft³/ft³) | V/V (ft³/ft³) | V/V (ft³/ft³) |
| 1800 | 321 | 297 | 275 | 241 |
| 1400 | 257 | 230 | 208 | 179 |
| 1200 | 208 | 185 | 167 | 146 |
| 900 | 128 | 118 | 109 | 102 |
| 600 | 70 | 67 | 64 | 59 |

Rich Gas Mixes - C2 Based, V/V Ratio
V/V Ratio at Maximum Concentration of C1, (ft3/ft3)

| TEMP °F >> | -50 | -40 | -30 | -20 |
|---|---|---|---|---|
| PRESSURE (psig) | V/V (ft³/ft³) | V/V (ft³/ft³) | V/V (ft³/ft³) | V/V (ft³/ft³) |
| 1800 | 324 | 303 | 283 | 265 |
| 1400 | 289 | 267 | 247 | 224 |
| 1200 | 271 | 250 | 230 | 211 |
| 900 | 246 | 224 | 204 | 180 |
| 600 | 70 | 67 | 64 | 62 |

STD SPECIFICATION GAS - M/M Ratio
MASS OF STORED GAS/MASS OF CONTAINMENT STEEL, (lb/lb)

| TEMP °F >> | -50 | -40 | -30 | -20 |
|---|---|---|---|---|
| PRESSURE (psig) | M/M (lb/lb) | M/M (lb/lb) | M/M (lb/lb) | M/M (lb/lb) |
| 1800 | 0.307 | 0.285 | 0.264 | 0.248 |
| 1400 | 0.321 | 0.288 | 0.260 | 0.240 |
| 1200 | 0.306 | 0.271 | 0.246 | 0.230 |
| 900 | 0.254 | 0.233 | 0.217 | 0.213 |
| 600 | 0.183 | 0.173 | 0.165 | 0.160 |

Rich Gas Mixes - C2 Based - M/M Ratio of Max C1 Content
MASS OF STORED MIX/MASS OF CONTAINMENT STEEL, (lb/lb)

| TEMP °F >> | -50 | -40 | -30 | -20 |
|---|---|---|---|---|
| PRESSURE (psig) | M/M (lb/lb) | M/M (lb/lb) | M/M (lb/lb) | M/M (lb/lb) |
| 1800 | 0.388 | 0.369 | 0.352 | 0.330 |
| 1400 | 0.508 | 0.481 | 0.455 | 0.413 |
| 1200 | 0.574 | 0.542 | 0.430 | 0.359 |
| 900 | 0.486 | 0.436 | 0.410 | 0.352 |
| 600 | 0.410 | 0.374 | 0.339 | 0.330 |

Concentration of C2 to yield Maximum V/V in Rich Mix
mol % of C2 and Phase at Maximum V/V

| TEMP °F >> | -50 | | -40 | | -30 | | -20 | |
|---|---|---|---|---|---|---|---|---|
| PRESSURE (psig) | Phase-mol% | Phase-mol% | Phase-mol% | Phase-mol% | Phase-mol% | Phase-mol% | Phase-mol% | Phase-mol% |
| 1800 | G | 6 | G | 9 | G | 12 | G | 15 |
| 1400 | G | 16 | G | 19 | G | 23 | G | 27 |
| 1200 | L | 21 | L | 25 | G | 28 | G | 31 |
| 900 | L | 38 | L | 42 | L | 46 | L | 49 |
| 600 | G | 1 | G | 1 | G | 1 | G | 1 |

PHASE AT GREATEST V/V : G = Gas, 2P = 2 Phase, L = Liquid

Fig. 6B

| STD SPECIFICATION GAS - M/M Ratio MASS OF STORED GAS/MASS OF CONTAINMENT STEEL, (lb/lb) | | | | | |
|---|---|---|---|---|---|
| TEMP °F >> | -50 | -40 | -30 | -20 | |
| PRESSURE (psig) | M/M (lb/lb) | M/M (lb/lb) | M/M (lb/lb) | M/M (lb/lb) | |
| 1800 | 0.307 | 0.285 | 0.264 | 0.248 | |
| 1400 | 0.321 | 0.288 | 0.260 | 0.240 | |
| 1200 | 0.306 | 0.271 | 0.246 | 0.230 | |
| 900 | 0.254 | 0.233 | 0.217 | 0.213 | |
| 600 | 0.183 | 0.173 | 0.165 | 0.160 | |

| Rich Gas Mixes - C3 Based - M/M Ratio of Max C1 Content MASS OF STORED MIX/MASS OF CONTAINMENT STEEL, (lb/lb) | | | | |
|---|---|---|---|---|
| TEMP °F >> | -50 | -40 | -30 | -20 |
| PRESSURE (psig) | M/M (lb/lb) | M/M (lb/lb) | M/M (lb/lb) | M/M (lb/lb) |
| 1800 | 0.419 | 0.398 | 0.385 | 0.330 |
| 1400 | 0.508 | 0.481 | 0.455 | 0.439 |
| 1200 | 0.575 | 0.542 | 0.392 | 0.368 |
| 900 | 0.486 | 0.436 | 0.398 | 0.354 |
| 600 | 0.410 | 0.374 | 0.339 | 0.322 |

| Concentration of C3 to yield Maximum V/V in Rich Mix mol % of C3 and Phase at Maximum V/V | | | | | | | | | |
|---|---|---|---|---|---|---|---|---|---|
| TEMP °F >> | -50 | | -40 | | -30 | | -20 | | |
| PRESSURE (psig) | Phase-mol% | Phase | Phase-mol% | Phase | Phase-mol% | Phase | Phase-mol% | Phase | |
| 1800 | 8 | G | 10 | G | 12 | G | 14 | G | |
| 1400 | 13 | G | 15 | L | 18 | L | 19 | L | |
| 1200 | 16 | L | 18 | L | 20 | L | 29 | 2P | |
| 900 | 31 | 2P | 37 | 2P | 41 | 2P | 47 | 2P | |
| 600 | 54 | 2P | 57 | 2P | 60 | 2P | 64 | 2P | |

PHASE AT GREATEST V/V : G = Gas, 2P = 2 Phase, L = Liquid

| STD SPECIFICATION GAS - V/V Ratio , (MW= 17.3, SG = 0.59) COMPRESSED STORAGE VOL / Std Condition VOL, (ft3/ft3) | | | | | |
|---|---|---|---|---|---|
| TEMP °F >> | -50 | -40 | -30 | -20 | |
| PRESSURE (psig) | V/V (ft³/ft³) | V/V (ft³/ft³) | V/V (ft³/ft³) | V/V (ft³/ft³) | |
| 1800 | 321 | 297 | 275 | 241 | |
| 1400 | 257 | 230 | 208 | 179 | |
| 1200 | 208 | 185 | 167 | 146 | |
| 900 | 128 | 118 | 109 | 102 | |
| 600 | 70 | 67 | 64 | 59 | |

| Rich Gas Mixes - C3 Based, V/V Ratio V/V Ratio at Maximum Concentration of C1, (ft3/ft3) | | | | |
|---|---|---|---|---|
| TEMP °F >> | -50 | -40 | -30 | -20 |
| PRESSURE (psig) | V/V (ft³/ft³) | V/V (ft³/ft³) | V/V (ft³/ft³) | V/V (ft³/ft³) |
| 1800 | 337 | 318 | 302 | 292 |
| 1400 | 314 | 294 | 278 | 271 |
| 1200 | 302 | 282 | 266 | 250 |
| 900 | 245 | 230 | 211 | 178 |
| 600 | 158 | 152 | 138 | 124 |

*Fig. 7B*

STD SPECIFICATION GAS - M/M Ratio
MASS OF STORED GAS/MASS OF CONTAINMENT STEEL, (lb/lb)

| TEMP °F >> | -50 | -40 | -30 | -20 |
|---|---|---|---|---|
| PRESSURE (psig) | M/M (lb/lb) | M/M (lb/lb) | M/M (lb/lb) | M/M (lb/lb) |
| 1800 | 0.307 | 0.285 | 0.264 | 0.248 |
| 1400 | 0.321 | 0.288 | 0.260 | 0.240 |
| 1200 | 0.306 | 0.271 | 0.246 | 0.230 |
| 900 | 0.254 | 0.233 | 0.217 | 0.213 |
| 600 | 0.183 | 0.173 | 0.165 | 0.160 |

Rich Gas Mixes - C4 Based - M/M Ratio of Max C1 Content
MASS OF STORED MIX/MASS OF CONTAINMENT STEEL, (lb/lb)

| TEMP °F >> | -50 | -40 | -30 | -20 |
|---|---|---|---|---|
| PRESSURE (psig) | M/M (lb/lb) | M/M (lb/lb) | M/M (lb/lb) | M/M (lb/lb) |
| 1800 | 0.424 | 0.404 | 0.395 | 0.367 |
| 1400 | 0.516 | 0.475 | 0.385 | 0.331 |
| 1200 | 0.445 | 0.395 | 0.398 | 0.374 |
| 900 | 0.431 | 0.385 | 0.352 | 0.326 |
| 600 | 0.356 | 0.322 | 0.295 | 0.277 |

Concentration of C4 to yield Maximum V/V in Rich Mix
mol % of C4 and Phase at Maximum V/V

| TEMP °F >> | -50 | | -40 | | -30 | | -20 | |
|---|---|---|---|---|---|---|---|---|
| PRESSURE (psig) | Phase-mol% | Phase | Phase-mol% | Phase | Phase-mol% | Phase | Phase-mol% | Phase |
| 1800 | 7 | G | 9 | G | 10 | G | 11 | G |
| 1400 | 11 | L | 13 | L | 17 | L | 20 | L |
| 1200 | 17 | L | 25 | L | 30 | 2P | 35 | 2P |
| 900 | 38 | 2P | 42 | 2P | 46 | 2P | 50 | 2P |
| 600 | 57 | 2P | 60 | 2P | 62 | 2P | 64 | 2P |

PHASE AT GREATEST V/V :   G = Gas, 2P = 2 Phase, L = Liquid

STD SPECIFICATION GAS - V/V Ratio , (MW= 17.3, SG = 0.59)
COMPRESSED STORAGE VOL / Std Condition VOL, (ft3/ft3)

| TEMP °F >> | -50 | -40 | -30 | -20 |
|---|---|---|---|---|
| PRESSURE (psig) | V/V (ft³/ft³) | V/V (ft³/ft³) | V/V (ft³/ft³) | V/V (ft³/ft³) |
| 1800 | 321 | 297 | 275 | 241 |
| 1400 | 257 | 230 | 208 | 179 |
| 1200 | 208 | 185 | 167 | 146 |
| 900 | 128 | 118 | 109 | 102 |
| 600 | 70 | 67 | 64 | 59 |

Rich Gas Mixes - C3 Based, V/V Ratio
V/V Ratio at Maximum Concentration of C1, (ft3/ft3)

| TEMP °F >> | -50 | -40 | -30 | -20 |
|---|---|---|---|---|
| PRESSURE (psig) | V/V (ft³/ft³) | V/V (ft³/ft³) | V/V (ft³/ft³) | V/V (ft³/ft³) |
| 1800 | 341 | 325 | 310 | 295 |
| 1400 | 319 | 303 | 287 | 265 |
| 1200 | 303 | 269 | 244 | 229 |
| 900 | 217 | 194 | 177 | 165 |
| 600 | 137 | 124 | 114 | 107 |

*Fig. 8B*

| CASE STUDIES | | Case A | Case B | Case C |
|---|---|---|---|---|
| | | STD GAS MIX | RICH GAS MIX | RICH GAS MIX |
| FLOW | | | | |
| Inlet | (BCF/D) | 1.00 | 1.00 | 1.37 |
| GAS PROPERTIES | | | | |
| Mol Wt | | 16.75 | 19.93 | 19.93 |
| Heat Value (HHV) | (BTU/FT3) | 1050 | 1223 | 1223 |
| PIPELINE | | | | |
| Length | (MILES) | 1000 | 1000 | 1000 |
| O.Dia | (IN) | 36 | 30 | 30 |
| OPN Pressure | (PSIG) | 1440 | 2250 | 2250 |
| Mass of Steel | (US TONS) | 463,900 | 499,800 | 499,800 |
| Avg Z Value under Flow | (Unitless) | 0.85 | 0.65 | 0.59 |
| COMPRESSION | | | | |
| Operating Power | (BHP) | 133,000 | 110,000 | 185,000 |
| CO2 Emissions | | 1249 | 1064 | 1.786 |
| DELIVERY | | | | |
| Flow | (BCF/D) | 0.980 | 0.986 | 1.351 |
| Heat Rating - (Million BTU/TON PIPE/D) | | 2.217 | 2.411 | 3.305 |

FIG 9A

| REFRIGERANT DESIGNATION | REFRIGERANT NAME | ΔH (300K) J/kg per K° | ΔH BTU/lb per R° |
|---|---|---|---|
| R170 | Ethane | 139 | 0.0332 |
| R356 | Propane | 356 | 0.0850 |
| R600 | Butane | 320 | 0.0764 |
| R600a | Iso Butane | 323 | 0.0771 |
| R21 | CHCL2F | 228 | 0.0544 |
| R134A | CH2FCF3 | 209 | 0.0518 |
| R404A | CHF2CF3 | 339 | 0.0810 |
| R13 | CCLF3 | 565 | 0.1349 |

FIG 9B

INTEGRATED MULTI-FUNCTIONAL PIPELINE SYSTEM FOR DELIVERY OF CHILLED MIXTURES OF NATURAL GAS AND CHILLED MIXTURES OF NATURAL GAS AND NGLS

CROSS-REFERENCE TO RELATED APPLICATIONS

This application is a divisional of U.S. patent application Ser. No. 15/607,653 filed May 29, 2017, which claims the benefit of U.S. Provisional Application No. 62/342,688 filed May 27, 2016, and U.S. Provisional Application No. 62/436,317 filed Dec. 19, 2016, the content of each of which is incorporated herein by reference in its entirety. This invention is also related to U.S. Pat. Nos. 6,217,626 and 6,201,163, the content of each of which is incorporated herein by reference in its entirety.

FIELD

Embodiments herein relate to high pressure pipeline systems used for delivery of chilled natural gas mixtures to a terminus for subsequent downstream applications such as in LNG, Separation/fractionation facilities and mobile trans-shipment. More particularly, the new method delivers a chilled product directly from the pipeline providing most, if not all of the chilling energy requirement to meet downstream specification of temperature and pressure for subsequent applications. In support of the processing function the packing characteristics of delivered product under pre-chilled conditions permit the upstream pipeline section to be utilized for containment of stored buffer volumes as suits the flow demands of the processing facilities.

BACKGROUND

Traditionally natural gas and/or mixtures of natural gas and NGLs (Products) have been transported by pipelines to deliver such products at the terminus of such pipelines as dictated by the pressure and temperature needs of downstream applications such as separation/fractionation, LNG production and trans-shipment.

Chilling of Products is often required for said downstream applications. The traditional approach is to accept some chilling using small available pressure differentials at the destination, typically providing a low degree of Joule-Thompson effect chilling typically to the range of −10 F degrees to −25 F degrees. The bulk of further process chilling of these Products is then achieved by external means at significant energy consumption.

There remains a need for more cost effective chilling to meet downstream process demands.

SUMMARY

The methods herein provide significantly more cost effective chilling and increased pressure energy recovery, thereby reducing/eliminating the need for costly external chilling to meet downstream process demands depending on the application. In particular the method reduces much of the pre-chilling infrastructure involved with LNG processing.

Further, methodologies disclosed herein, integrated with the needs of the downstream process, delivers these Products for subsequent processing using the greater pressure differential available from an elevated pipeline maximum operating pressure (MOP). The higher reductions in pressure and temperature exceeding those of traditional segregated pipeline/process systems are achieved through a turbo expander or similar Joule-Thompson (J-T) device at the terminus of the pipeline. The above steps substantially increase the benefits of the chilling stage to the range of about −60 F degrees to about −100 F degrees.

As well, considerable recovery of the last stage pipeline pressure energy now becomes available as electrical/or shaft power where the J-T device is coupled with generation/mechanical linkage.

Herein, Applicant applies methods for manipulation of gas transport and delivery parameters that result in significant increases in the mass rate of product delivered for a given pipeline. Reductions in capital expense and energy required for both transport and chilling, and savings in trans-shipment infrastructure and expense.

The customary handover of prior Rich Gas mixtures between project design groups for pipeline and process aspects primarily imposes and results in a gradual drop in configured pipeline flowing pressure to a level just above the minimum receipt specified for the downstream process. The process design group then dictates control, compressing, heating or energy intensive chilling of the Product for further treatment. This invariably involves considerable loss and replacement of available energy from a high pressure pipeline. The new methodologies disclosed herein bridge that gap by providing first stage process conditioning for chilling requirements, more efficiently using inherent properties of the current product delivered directly from the pipeline. Control and location of this pre-chilling can be under the pipeline or process operational jurisdiction and ownership.

In conventional systems, delivery pressure differential may result in a small temperatures drop with the majority of process chilling being achieved by external means heat exchange methodologies, such methodologies requiring outside energy to chill the Products.

Herein, Applicant enhances delivery conditions for heretofore untapped opportunities for internally-generated chilling Products that is significantly more cost effective than the prior external-generated chilling of Products. The traditional approach having modest delivery pressures and differentials would at most result in chilling during pressure letdown in a range of −10 F degrees to −25 F degrees, the balance to Product conditions being chilled through known exchange methodologies.

This new art extends the boundary conditions of pipeline pressure, temperature and NGL constituents of existing technologies for the transportation and optional storage of North. American Spec natural gas mixtures or rich mixtures of natural gas/NGLs, (Products), in a pipeline system for delivery of chilled Products for downstream applications.

The delivery of "internally" chilled Products at the terminus of the higher pressure section of the pipeline system significantly reduces capital and operating costs compared to traditional methods of "externally" chilling these Products using auxiliary processing infrastructure.

The installation of a high lift compressor station with an increase of the Maximum Allowable Operating Pressure (MAOP) of pipeline section(s) of natural gas delivery system primarily provided the optimal environment for refrigeration pressure differential by Joule-Thompson chilling of the pipeline contents.

The new system provides an integrated multi-functional pipeline derived system, for the reduction in energy for both transport and downstream processing of the aforementioned Products by making available a larger deltaP pressure reduction than that normally associated with traditional process considerations. This includes, at the terminus of the last stage high pressure pipeline section, a turbo expander or similar device which reduces pressure and "internally" chills the outflowing Products through the Joule-Thompson effect of their constituent properties. This system can also be retrofitted to existing pipeline systems for certain applications. Recovery of pipeline pressure energy for power generation can also be harnessed if a turbo expander or similar device used for pressure reduction is then employed to generate electricity or shaft power. Process energy/heat transfer normally acquired from "external" sources can then be largely displaced by this form of recovered upstream energy missing in traditional segregation of pipeline and process disciplines.

Additionally, the NGL content carried in such mixtures in a single pipeline eliminates the need for a separate pipeline, or other means for transportation of multiple product streams to markets. Coupled with higher pressure operation the effects of enhanced NGL content results in a reduction in diameter of the pipeline by at least one standard size over that for an equivalent flow of Spec natural gas.

The economy of scale of a single facility to process the Rich Gas mixtures at the market place reduces capital and operating costs compared to numerous smaller field facilities.

Delivery of outlet Products can be set to prescribed temperature and Pressure dependent on downstream application. Substantial overall reduction in energy consumption and associated CO2 emissions is thereby achieved through integrated pipeline/processing applications.

The method described herein, integrated with the needs of a variety of downstream processes, delivers these Products for subsequent processing using the greater pressure differential available from an elevated pipeline maximum operating pressure (MOP) and adjustments to the conveyed mixtures. Higher reductions in pressure and temperature are achieved through a turbo expander or similar Joule-Thompson (J-T) device at the terminus of the pipeline, those reductions exceeding those of traditional segregated pipeline/process systems As disclosed herein, the pressure differentials employed substantially increase the benefits of the J-T chilling stage in the range of −60 F degrees to −100 F degrees.

As well, in another embodiment, considerable recovery of last-stage pipeline pressure energy is available as electrical/or shaft power when a J-T device with generation/mechanical linkage is used to achieve the J-T chilling.

Without limitation, the new method provides significantly more cost effective chilling and increased pressure energy recovery, and thereby reduces/eliminates the need for costly external chilling to meet the downstream process demands depending on the application.

In EMBODIMENTS FOR PROCESSING: Applicant controls the pipeline compression cycles, to heretofore higher pressure differentials, and concurrently provides destination storage at new higher pressures. This enables a J-T effect for significant, if not all, process chilling of the product from the storage at the destination. This also enables delivery of a chilled gaseous product at commercial densities for transshipment in lighter lower pressure containment vessels.

According to one aspect of this disclosure, at final recompression or storage pressures of about 4500 psig to about 3200 psig are attained. At the aforementioned range of pressures, the Joule Thompson chilling effect that accompanies gas expansion becomes effective.

The available pressure differential from Applicant's high pressure pipeline containment conditions, let down to destination process levels, far exceeds those of traditional gas process steps. In respect of these higher pressure differentials for both Standard Spec Gas and NGL enhanced mixtures Applicant has determined that temperature reductions down to −100 F or colder are available for the described mixtures.

These mixtures are to be specified free of water and CO2 constituents that would otherwise be susceptible to hydrate and freezing issues at these extreme conditions.

CHILLING EMBODIMENTS FROM JOULE THOMPSON EFFECT: Energy efficiency is enhanced due in part to the ability to drop the pressure of these enhanced mixtures from their high pressure containment levels to destination pressures, thereby. The heretofore unavailable processing pressure differentials efficiently utilize the high refrigerant properties (latent heat of vaporization) from the high levels of constituent NGLs in the Flow-stream as the pressure is permitted to drop to process levels further differentiates this system from other pipeline systems and downstream stream process configurations.

The customary handover of prior Rich Gas mixtures between project design groups for pipeline and process aspects primarily imposes and results in a gradual drop in configured pipeline flowing pressure to a level just above the minimum receipt specified for the downstream process. The process design group then dictates control, compressing, heating or chilling of the Product for further treatment. This invariably involves considerable loss and replacement of available energy from a high pressure pipeline. The new methodologies disclosed herein bridges that gap by providing first stage process conditioning for chilling requirements, more efficiently using inherent properties of the current product delivered directly from the pipeline.

The J-T effect, caused by forcing the stored gas mixture through the resistance of a J-T valve, chills the gas in an adiabatic manner. This gives a high degree of cooling of the delivered gas without work being added to or done by the system. In other embodiments, using a turbo expander at the point of installation of the J-T valve recovers a large part of this pressure energy in the form of generation of electricity or shaft power at the delivery point while the chilling takes place. This power recovery can be substantial, having values in the order of 5,000 to 10,000 kW pre BCF/d of flow on a large installation. The recovered power can be used directly for upstream recompression or more generally for electrical generation exported to the grid or for other process use.

These preconditioned temperature reductions are particularly attractive to lessening the heavy energy load for LNG processing where final stage temperatures are reduced to the region of −260 F. Where demonstrated economies of scale must be shown for the viability of these megaprojects to occur, the less intense capital expenditure on reduced size of chilling plant and availability of recovered pipeline compressive energy from this invention warrants consideration.

Conventional natural gas compressive characteristics and pipeline delivery conditions require high pressure storage for good levels of volumetric retention. High pressures demand thick walled vessels, resulting in expensive pressure containment in the context of trans-shipment ships or vessels. In the case of a trans-shipment vessel, without limiting further applications, the resulting increased densities of the current Rich Gas mixtures can be contained at lower pressures than previously possible: more so when chilled, they can be shipped in less expensive, lighter wall containers. Herein, the current chilled product can be stored at lower pressures of about 1300 psig and yet match the transport volume of Standard Transmission specification gas shipped under the much higher pressures at 1800 psig plus levels. The improvement in the gas to steel mass to volume ratio of Rich Gas mixes relative to Standard Specification gas storage is of the order of 50%. This effective reduced use of steel containment can amount to tens of millions of dollar savings in a marine vessel designed for 20,000 tons of Rich Gas capacity, and further add to the economic distance over which such a vessel can deliver its cargo.

IN HYDRAULIC FLOW EMBODIMENTS: Higher pressure pipeline operating conditions are provided for transmission of Rich Gas mixtures with elevated levels of Natural Gas Liquids (NGL) constituents, either inherent in the mixture or achieved by additive or subtractive means, which create additional reductions in the Z factor values over those available in the prior art. In embodiments, higher pressure transmission pipelines with enhanced Rich Gas mixtures can be configured to operate for most efficient general transmission at upper or of MOP operating pressures of over about 2250 psig and in further embodiments between MOP of about 2250 to about 2850 psig. Recompression can occur at about 1500 psig or at recompression thresholds of between about 1500 to about 1900 psig to attain the hydraulic and compressive power benefits from optimum compressibility Z values and enables reduction in pipe diameters by at least one standard size over those for prior lower pressure designs for reduced capital cost.

Various methods of conditioning natural gas mixtures are applied in a pipeline for implementing lower compressibility (Z) factors such that the resulting mixture also exhibits internal chilling behavior during its transport and storage within the pipeline infrastructure. This mixture is formulated by additive or subtractive processing of the natural gas and NGL constituents. Operational conditions where these effects occur are between a storage pressure of about 3500 psig reduced in pressure to 800 psig and 120 F and −120 F respectively. The low temperature range is reserved for the lightest mixtures not exhibiting liquid fall out. Further, a pipeline carrying lean North American Spec Gas or NGL Rich Gas, that is project specific in volume, by virtue of its entire length and cross sectional area and pipe layout, used for product flow, high pressure storage, and de-pressuring the contents, which operates within the limits of a storage pressure of about 4500 psig reduced down to a low pressure of about 350 psig according to end use for a chilled delivered product.

As NGL constituents are transported in a single pipeline system, mixed with the natural gas component, the NGLs are transported for a fraction of the cost of building separate pipelines and handling infrastructure. Flowing Rich Mixtures also reduce the complexity of field plants to handle NGLs, and also at the delivery point where economies of scale can be obtained from a single separation/process facility built at that site.

As an example, comparison of an embodiment of the current pipeline system, compared to an installation-based the technology set forth in the earlier U.S. Pat. No. 6,217,626, limited to an MOP of about 2150 psig, shows a 35% increase in flow of its Rich Gas per unit of compressive horsepower over the lower pressure industry configurations that were the norm at the time of its construction. Herein, implementing a MOP that is raised incrementally to about 2250 psig and flowing a product of more dense NGL-enhanced Rich Gas mixture the new configuration can deliver approximately 12% more volume of the Product per unit of compressive horsepower, all without risk of liquid falling out of the gaseous phase.

Accordingly, world scale delivery and processing of NGL constituents of the order of 100,000 bbl/day per 1.0 BCF/day of the utility gas component can be conveyed in this single system.

STORAGE EMBODIMENTS OF ENHANCED RICH GAS: Herein, operational control is improved by implementing an intermediate storage capability without liquid fallout. As stated earlier, the ability to provide interim storage permits continued upstream or downstream operations despite process disruption at opposing ends of the process. Storage density is a function of the low Z factor particularly for an enhanced Rich Gas mixture held under high pressure conditions at ambient flowing temperatures.

Optional storage conditions exist within the pipeline system given the high packing densities of the claimed mixtures. This feature is enabled by the provision of an ultra-high pressure accumulator section of the pipeline generally located immediately upstream of the terminus of the pipeline. Storage configurations within the pipeline system become an optional function of project-specific needs, and can be provided in the form of a number of parallel loops of pipe of predetermined diameters, or a single section of larger diameter.

Conventional natural gas compressive characteristics and pipeline delivery conditions require high pressure storage for good levels of volumetric retention. High pressures demand thick walled vessels, resulting in expensive pressure containment in the context of trans-shipment ships or vessels.

In the case of a trans-shipment vessel, without limiting further applications, the resulting increased densities of the current Standard Spec Gas and Rich Gas mixtures under lowered temperatures can more effectively be contained at lower pressures than previously possible: The mixtures can be shipped in less expensive, lighter wall containers. Herein, the Rich Gas chilled products can be stored at 1300 psig and match the transport volume of Standard Transmission specification gas shipped under the much higher pressures at 1800 psig plus levels. The improvement in the gas to steel mass to volume ratio particularly of Rich Gas mixes relative to Standard Specification gas storage is of the order of 50%. This effective reduced use of steel containment can amount to tens of millions of dollar savings in a marine vessel designed for 20,000 tons of Rich Gas capacity, and further add to the economic distance over which such a vessel can deliver its cargo.

EMBODIMENTS OF ENERGY INTENSITY: High pressure cycles in the transmission system and the selection of the NGL constituents allow for the inclusion of Rich Gas mixtures with an upper value of MW of about 23.2 adapted to an appropriately designed pipeline. Energy levels of the order of about 1500 BTU/ft3 for the higher heating value (HHV) of the delivered Rich Gas mixtures can result. This favourably compares to the HHV value of 1050 BTU/ft3 for a typical North American Standard Transmission specification gas delivered in today's pipeline network.

EMBODIMENTS REGARDING DOWNSTREAM PROCESSING, the delivered gas can now be customized to both optimal temperature and pressures of specified downstream process applications such as LNG, separation and fractionation facilities. When provided as described above, the internally generated chilling can replace first stage or even second stage process chilling trains of the prior art. The energy of the high pressure pipeline section results in coupled with the high degree of "internal" chilling. Harnessing the behavior of the refrigeration properties of the flowing products within a pipeline adds a new dimension to energy savings in the processing of natural gas mixtures. The customary requirement for refrigeration of process products of natural gas mixtures that has been normally provided externally from energy intensive infrastructure can now be minimized or eliminated with the integration of high pressure pipeline and process design. This can be built into the design of new projects or installed as a retrofit to existing infrastructure.

Coupled with increased demands for lowered emissions per unit of compression and increased energy delivery per mass of pipe installed, embodiments herein now enable industry to further meet societal demands for increased energy delivery and efficiency with reduced CO2 emissions for both Rich Gas and Standard Transmission Spec Gas.

Extending the benefits of high pressure internal chilling to even the lesser NGL content of Standard Spec natural gas mixes enables even these mixtures to require substantially less process energy when subjected to chilled storage or LNG production.

The customary requirement for refrigeration of process products that has been normally provided externally from energy intensive infrastructure that can now be minimized or eliminated with the integration of pipeline, process design, and/or as a retrofit to existing infrastructure.

Historically pipelines and downstream facilities such as gas processing and LNG facilities have been treated as independent functions, and have been designed, constructed and managed as separate unrelated functions in the hydrocarbon energy infrastructure space with very little understanding or appreciation for the operational relationships of their respective functions Herein Applicant has determined that significant efficiencies can be achieved by considering the capability and needs of both the pipeline and downstream functions. A new integrated method for delivery and transport of chilled gas product to downstream applications has been developed.

In summary, in a pipeline gas transmission system, the last compressor station, for storage or preparatory for chilling, is used to increase pressure prior to conditioning of the product by chilling of the gas through a J-T device, the chilling optionally conducted through a downstream turbo-expander for generation of recovery power for other applications. Storage pressure created by this last compressor is customized and designed for a specific downstream application. One can a pressure environment to enable sufficient chilling for the separation and fractionation of NGL's from natural gas for processing facility applications Depending on the gas mixture, one can provide a significant portion of the chilling for LNG applications thereby reducing, by the equivalent level, capital and operating costs comparable to conventional systems. One can retrofit existing pipeline systems for existing gas processes and LNG facility applications. Recovered power from the J-T device can be used for additional power needs, fractionation or sold to the electric grid system.

Herein, Applicant has advanced the known pipeline systems by providing a method of accelerating the onset of lower compressibility (Z) factors in natural gas pipelines, implementing broader pressure, temperature, and range of constituents within Rich Gas mixtures for yielding a new array of transportation benefits including: a wider band of low flow resistance in pipelines over prior art otherwise restricted by lower maximum operating pressures; increases in storage densities resulting from these lowered Z factors; and an ability to take advantage of high levels of NGLs within the new gas mixtures and their behavior within the broader pipeline pressure differentials (sitting within 3500 psig and 900 psig), The pipeline differentials that result enable effective use of the J-T effect for "internal" chilling to occur from within the product transported by the pipeline, without a need for added external energy.

This internal chilling matches or exceeds that of conventionally provided by costly and external chilling via heat exchangers and industrial refrigerants commonly used in the downstream gas processing industry, applied to products below 800 psig and 1300 psig plant design thresholds. These industrial refrigerants in the prior art here are frequently non-hydrocarbon in nature and increasingly being avoided or withdrawn from the market in recognition of their severe and negative environmental impact.

Applicant delivers a pre-chilled product by pipeline that alleviates this energy and environmental demand on the industry. Further, when provided via turbo expander, Applicant's system recovers pipeline energy otherwise lost in the custody transfer between segregated pipeline and end process disciplines.

In conclusion, this disclosure sets forth a method of accelerating the onset of, and access to, lower compressibility (Z) factors in natural gas pipelines such that flow resistance and storage density are improved. The properties of the Rich Gas mixtures and higher operating/storage pressures involved are such that internal chilling within the transported medium can then take place through the Joule-Thompson effect, making a lower pressure delivery of a Rich Gas Product direct from the pipeline. The subsequent delivery of a chilled product using recovered pipeline energy can replace a substantial amount of chilling otherwise externally created for many downstream applications Design developments incorporated herein permit simplified operations within a broader pressure range of low compressibility factor (Z) operation to take place. Preconditioning processing in the field is simplified, mainline compressor stations can incorporate single units. Operating pressures now broaden between 2500 psig through the best efficiency point around 2100 psig to the recompression point of about 1300 psig or about 1450 psig, depending on gas mixture.

On a project specific basis there is nothing to preclude design and construction of all sections of the pipeline to a high MOP of about 3500 psig for realizing hydraulic, storage and chilling benefits throughout its length.

Reduced capital expenditure, compression infrastructure and operating costs emerge from this less energy and emissions-intensive Rich Gas transmission, chilling and containment system. The need and environmental impact of multiple pipelines, rail and trucking movements for gas and NGL transport is eliminated or takes place through seamless integration of new process plant and retrofitting of existing infrastructure to meet future demands on the industry.

BRIEF DESCRIPTION OF THE DRAWINGS

In the following description, reference is made to the accompanying drawings:

FIG. 1 is a schematic of one embodiment of a pipeline system disclosed herein with expanded storage staging section and transshipment facilities to precondition flow for downstream processing and facilities for loading land, marine or air vessels. As a multiplicity of gas mixtures can be implemented, embodiments of storage and transmission behavior is simply provided herein using two component mixtures of methane with each of the primary NGLs of ethane, propane, and butane.

FIG. 1A shows a pressure trace at corresponding points of flow in FIG. 1, against the backdrop of the phase envelope of the transmitted gas-based on a re-injected ethane-rich gas mixture from natural gas produced in Alaska;

FIG. 1B shows a temperature trace at corresponding points of flow in FIGS. 1 and 1A;

FIGS. 6A through 8C illustrate the storage aspects attainable within the pipeline system simplified as 2-component Rich Gas mixes, and quantified as ratios of Mass-of-Gas to Mass-of-Containment Steel FIG. 6A illustrates storage characteristics of pipe containment ethane-based rich gas mixtures showing regions of optimal net volume ratio of ethane-based mixtures compared to CNG volume ratios under same storage conditions, wherein comparable mass of gas to mass of containment steel pipe ratios are listed;

FIG. 6B illustrates gas storage characteristics of ethane-based rich gas, with tabulated data of concentration of ethane for densest mixture under stated conditions of temperature and pressure, wherein resulting maximum volume ratio of mixture under stated conditions of temperature and pressure exceeds those of Standard Transmission specification mixture, and lower storage pressures reflect with lower m/m mass ratio for containment;

FIG. 7B illustrates gas storage characteristics of propane-based rich gas, with tabulated data of concentration of propane for densest mixture under stated conditions of temperature and pressure, wherein resulting maximum volume ratio of mixture under stated conditions of temperature and pressure exceeds those of Standard Transmission specification mixture, and lower storage pressures reflect with lower m/m mass ratio for containment;

FIG. 8B illustrates gas storage characteristics of propane-based rich gas, with tabulated data of concentration of butane for densest mixture under stated conditions of temperature and pressure, wherein resulting maximum volume ratio of mixture under stated conditions of temperature and pressure exceeds those of Standard Transmission specification mixture, and lower storage pressures reflect with lower m/m mass ratio for containment;

FIG. 8C further illustrates regions and limitations of the butane-based rich gas of FIG. 8B for illustrating preferred VN and M/M ratios over those of standard transmission gas and limitations where rich gas mixtures could stray into the liquid phase;

FIG. 6 illustrate the internal chilling aspects now available from contained gas behavior under the claimed operating and storage conditions for the pipeline. For the most part the Joule Thompson effect kicks in at a pressure of 3200 psig. Higher pressures generally occur from operational storage considerations and can be further utilized downstream of the pipeline.

FIG. 9A shows a comparison between a conventional pipeline system and the transmission system of FIG. 1; illustrating benefits in deliverable heat value, reduction in pipe mass, compression power, fuel and CO2 emissions;

FIG. 9B shows a selection of values of the heat of vaporization of outgoing CFC refrigerants and those similar values of NGLs operating from an initial temperature of 80° F.

DETAILED DESCRIPTION OF THE EMBODIMENTS

Figure 1C:
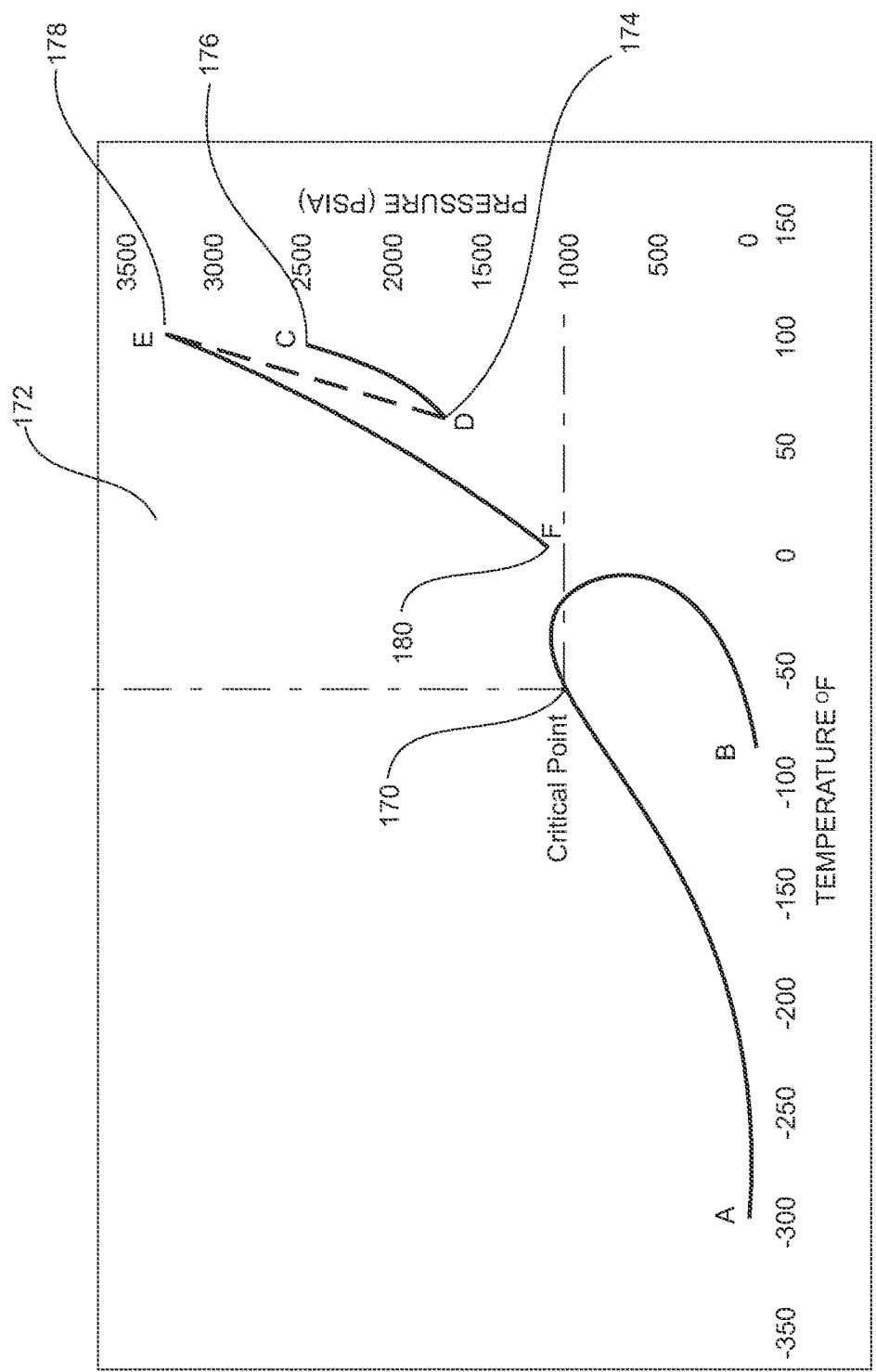
FIG. 1C illustrates the pressure temperature trace of the gas flow in the pipeline relative to the phase envelope of the flow mixture. Three staging steps are covered from the normal pipeline section flow between compressor stations, to the high pressure storage containment, to the delivery pressure drop with chilling specified for Product delivery.

Having reference to FIGS. 1, 1A, and 1B, embodiments of the operation of a multifunctional high pressure Rich Gas pipeline system 100. As shown in schematic form in FIG. 1, the system 100 is illustrated for moving a product of mixtures of natural gas and NGLs through a series of compression/recompression cycles 112 from a source 110 to a destination 126.

In FIGS. 1A and 1B, pressure and temperature traces respectively are shown for the operating scenario of FIG. 1A, that transmits and stores the natural gas mixture in the dense phase mode, and are arranged to correspond with the steps of system 100. The operating scenario is overlaid on the backdrop of the phase envelope of the gas being transmitted and stored according to FIG. 1.

In FIGS. 1A, 1B, reference characters "A", "B", "C", "Cx", "D", "E" and "F" are matched to the component locations shown in FIG. 1.

In FIG. 1 the pipeline system 100 comprises several transmission staging sections, including a transmission or pipeline staging section 102 for moving rich gas from the source 112 to the destination 126, a storage staging section 104 for storing the transmitted rich gas at or near the destination, and a trans-shipment staging section 106 having necessary facilities for delivering rich gas to downstream applications. In each staging section 102, 104, 106, NGLs or make up methane gas may be injected into the pipeline 112 or storage pipes at points m/118 for adjusting the rich gas therein.

The pipeline transmission staging section 102 comprises one or more pipelines 112 for moving natural gas mixture, and one or more compressors 114 for recompression of the natural gas mixture at each section to a higher pressure. Thus, the pipeline staging section 102 transmits natural gas mixture within desired pressure and temperature ranges.

In embodiments, the natural gas mixture is a Standard Gas mixture Rich Gas mixture, formulated by additive or subtractive processing, and comprising: from 40% to 98% by molar volume (mol volume) of methane, from trace to 35% by mol volume of ethane, from trace to 22% by mol volume of propane, from trace to 9% by mol volume of butane, and trace elements of C5+(i.e., C5, C6, . . . ) hydrocarbons not exceeding 0.25% by mol volume; and the total of (a) to (e) being 100%, and such mixture being completely gaseous or dense phase (supercritical) with no liquid phase at the temperature and pressure of operation.

The pipeline extends from the source to the destination, through a series of recompression cycles. One or more, or all of recompressions raise the Rich Gas to a maximum operating pressure (MOP), having a Rich Gas mixture adjusted to avoid liquid fallout. The re-compression pressure is raised of over about 2250 psig and in further embodiments between MOP of about 2250 to about 2850 psig. As energy and pressure is lost over the 100 or more kilometer transmission between compressor stations, recompression can occur at about 1500 psig or at recompression thresholds of between about 1500 to about 1900 psig to attain the described hydraulic and compressive power benefits from optimum compressibility Z values. Further, as the volumetric efficiency of the Rich Gas mixture is improved, one can reduce in pipe diameters by at least one standard size over those for prior lower pressure designs for reduced capital cost whilst moving the same mass of Rich Gas.

Figure 2A:
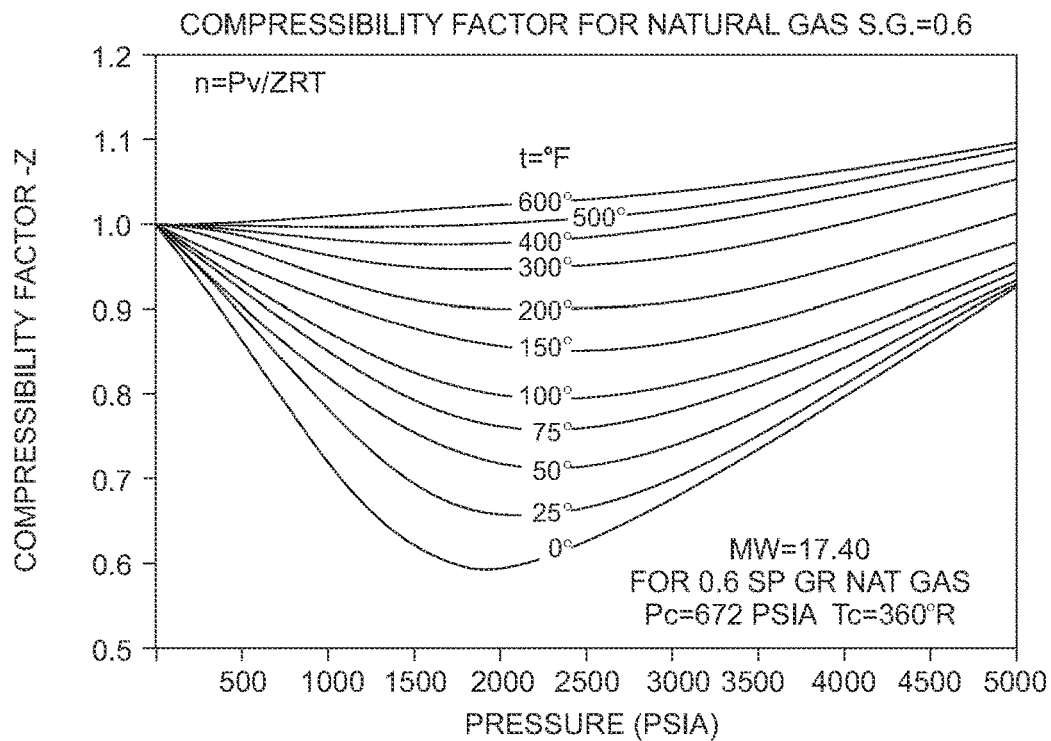
FIG. 2A illustrates the compressibility factors of typical transmission specification gas mixture having an S.G.=0.6, a catenary trace for Z Factor values for selective temperatures is shown and a typical Z Factor at 75 F at transmission pressures of 1500 psig.
Figure 2B:
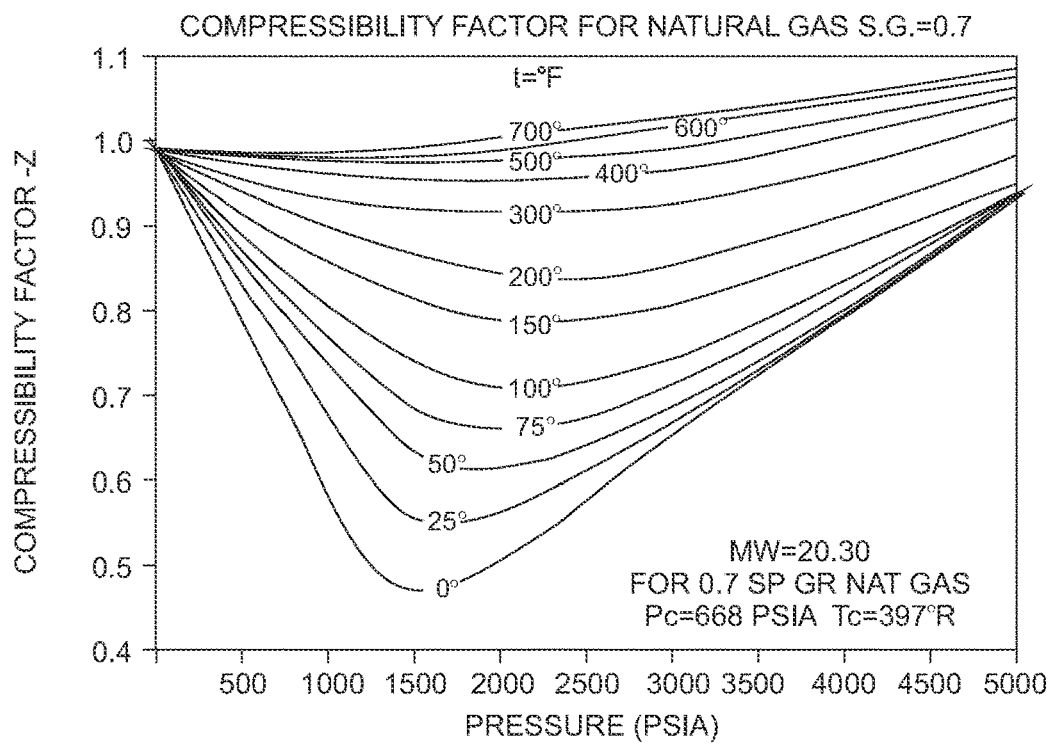
FIG. 2B illustrates the compressibility factors of typical of an example Rich Gas mixture, a catenary trace for Z Factor values for selective temperatures. The path traced by gas flow in the current pipeline staging sections at high to low pressures is shown as A-B-C.

In this embodiment, and in greater detail, the pipeline staging section 102 operates with a maximum operating pressure (MOP) of 2500 psig and recompression at 1300 psig, utilizing a range of low compressibility factors Z range, Point A to Point B to Point C of FIG. 2B, and at temperatures between about 50° F. and about 120° F.

Transmission pipeline compressors are shown as "C" types. In the final Storage/Delivery pipe section 104 the pressure is lifted through stepped compressors "Cx" from 1300 psig to 3000 psig storage to provide the head for de-compression (D-E). This drop in pressure at the exit of the storage section reduces the storage temperature via Joule-Thompson effect on the flowing products to −45 F as shown here. Depending on the gas mixtures and pressure drop, much lower temperatures in accordance with downstream Application can be provided.

The above described arrangement of transportation management and the use of above described rich gas mixture provide a synergy in pipeline operations resulting in an option to use smaller pipe diameters for same transmission capability and while reducing compressive power needed for Rich Gas pipelines.

Further, the final pressure and temperature conditioning of the natural gas, departing the Turbo Expander into pipeline section 106 at the destination, results in large savings in both capital and operational costs to produce the delivered product in a form that eliminates the need for the first stage chilling of the certain downstream applications. Overall, the capital costs of such pipeline systems are reduced over conventional natural gas transportation systems.

The higher transmission efficiency and thus the lower cost of the pipeline system disclosed herein is obtained by transmitting natural gas mixtures, such as the rich gas mixture disclosed herein, at desired pressure and temperature ranges to achieve a lower compressibility factor (Z) substantially throughout during transmission.

With reference to FIG. 1C the Phase Envelope for a Rich NGL-laden Alaska gas mixture is noted alongside the pipeline pressure/temperature trace. The trace C-D is representative of pipeline section flow, the trace D to E is the high pressure lift to storage, and E to F is the drop of pressure and temperature through a simple Joule-Thompson valve to a condition suited to gas separation or chilled Compressed Natural Gas (CNG) storage. The phase remains gaseous without liquid fall out throughout the transmission of the Product to Downstream Applications.

With reference to FIGS. 2A and 2B, compressibility factor (Z) comparative characteristics of typical Standard Transmission specification gas mixtures and Rich Gas mixtures are represented. Properties of typical Standard Transmission gas of MW=17.4 are shown on FIG. 2A. Characteristics of the Rich Gas mixture and the compressibility factors thereof are represented by a gas of MW=20.3 as shown in FIG. 2B.

Both the pipeline hydraulics and net storage densities are improved by incorporating a lower Z value in the system design by virtue of the NGL constituents in the gas mixture. The process disclosed herein takes advantage of the accumulated effects of stored density and pipeline hydraulics to elevate the transmission economics to another level. A typical MOP of a pipeline carrying Standard Transmission specification gas mixture at about 1450 psig at 75° F. (see point S of FIG. 2A) with a Z value of about 0.79.

Whereas prior teaching advocated running Rich Gas mixture pipelines between 2100 psia and 1300 psia (left of Point B to Point C of FIG. 2B), Applicant has discovered that advances in steel toughness to counter crack propagation now permits the use of higher pressures, enabling operations in the region found on the right portion of the low Z value inflexion from point B on the catenary curve of FIG. 2B. Now a pipeline carrying above described rich gas mixture can run between 2500 psia (Point A of FIG. 2B) through the low Z value spot at 2100 psia (Point B of FIG. 2B), and even lower down to a pressure of about 1300 psia to 1500 psia in the region about Point C of FIG. 2B before recompression. The higher MOP achieving hydraulic benefits also is advantageous towards stepping the Rich Gas storage upwards towards levels shown in FIGS. 4 and 5 to attain the internal or self chilling advantages of Rich Gas mixtures. Optimally designed, the operation of the rich gas pipeline at the new higher MOP towards Point A of FIG. 2B can result in a 12% increase in flow for less power per unit of gas over the performance of the earlier high pressure designs with an MOP at Point B of FIG. 2B.

Now a pipeline carrying above described rich gas mixture can run between 2500 psia, Point A, through the prior known low Z value at 2100 psia at Point B, and even lower down to a pressure of about 1300 psia to 1500 psia in the region of Point C before recompression.

The recompression point depends on station spacing and pipe diameter relative to pipeline flow rate. This wider recompression pressure cycle, or wider operating pressure range, also permits longer distances between compressor stations for reduced capital expenditure.

Optimally designed, the operation of the rich gas pipeline at the new higher MOP towards Point A can result in a 12% increase in flow for less power per unit of gas over the performance of the earlier designs with a MOP at Point B.

In an embodiment, by recompressing at about 1300 to about 1450 psia, at about Point C, Applicant found new operating efficiencies that outweigh the required increase in pipe wall thickness demanded by the higher MOP. Compared to conventional pipeline systems, the average Z value drops from 0.705 to 0.682, and the compressor station spacing increases by 15%, easily removing one complete compressor station from the infrastructure of a typical 1000 mile long-distance pipeline. For example, conventional spacing of one station per 100 miles might be increased to one station per 120 miles, further reducing capital cost and complexity.

Storage for Compressor Outage Situations:

Referring to FIGS. 1, 1A and 1B, in an embodiment, compaction of the natural gas mixture in the standard-diameter pipeline sections 112 between compressor stations 114 acts as a line pack accumulator 122. The amount of gas stored in the accumulator portion(s) 104 permits a correctly designed dense phase pipeline to operate at normal flow for several days in the event of a station outage before the new steady state, lower flow conditions dictated by the outage set in place. This now enables the pipeline staging section 102 to be designed with a slight catch up overage in the horsepower available at each compressor station 114, which allows the system 100 to operate for this repair interval without the need for standby compressors at these stations 114. There is adequate time to repair breakdowns or even replace a compressor 114 or cartridges during this interval before the long term lower flow steady state conditions occur. Given the high reliability of modern compressor systems today this is a statistically low risk advantage to the operation of Rich Gas pipeline designs. This further reduces material and capital investment in each station of a dense phase pipeline system.

With reference to FIG. 1C the performance characteristics of the high pressure accumulator performance is illustrated against the backdrop of the Phase Envelope for a Rich NGL laden Alaska gas mixture, noted alongside the pipeline pressure/temperature trace. The trace C-D (176-174) is representative of pipeline section flow, the trace D to E (174-178) is the high pressure lift to storage, and E to F (178-180) is the drop of pressure and temperature through a simple Joule-Thompson valve to a condition suited to gas separation or chilled Compressed Natural Gas (CNG) storage. The operating conditions lie in the Dense Phase/Supercritical zone above and to the right of the Critical Point of the Gas, point 170. For accumulation, compression is shown from point 174 to point 178 at about 3250 psig where the mixture can be held under conditions of high density. The phase remains gaseous without liquid fall out throughout the transmission of the Product to Downstream Applications.

Point 176 marks the Maximum Operating Pressure (MOP) to which the gas is compressed in a mainline segment to 2500 psig. The pressure and temperature drop as the Product flows along the segment to the point of Re-Compression at point 174, 1750 psig. For normal flow from segment to segment, the gas would be compressed back to MOP level at 2500 psig and the cycle begin again.

However, for illustration the compression here is taken from point 174 to point 178 at 3250 psig, representing the containment condition in a high pressure storage stage of the pipeline where the mixture can be held under conditions of high density. The storage volume for the product would be dependent on the project-specific pipe volume made available here. From point 178 to point 180 the Product is seen to drop rapidly in pressure towards 1200 psig. This flow takes place in a J-T device such as a turbo expander, and temperature is noted to chill, in one embodiment, from 90 F to 1° F. as a result of the Joule-Thompson effect on the flowing medium, which is now available for delivery. These delivery conditions avail themselves for a selection of downstream applications. Far lower temperatures can be experienced for specific process needs by adjustment of inlet pressure and outlet pressure across the J-T device.

Storage for Delivery Demand:

The accumulator or storage staging section 104, usually located at the destination, comprises one or more storage pipes 122, and a Joule-Thomson (J-T) expander 132 (described later) for transmitting rich gas from the storage pipes to the trans-shipment staging section 106. A high, and last stage, pressure booster compressor station 116 can be located between staging sections 102 and 104 and has a high head capability to lift the pressure up from above described, normal operating pressures to a desired elevated storage pressure in the storage pipes 122.

In some embodiments each of the storage pipes 122 is a pipe having a longer section length and a larger diameter ("A" to "B" of FIG. 1B) to provide required storage volume. Further, compared to the pipelines 112, the storage pipe(s) 122 operate at a higher pressure to act as an accumulator for storage purposes. The high storage pressure, set at the upper level of where the Joule Thomson (J-T) effect is activated in the transmitted gas mixture, also provides the differential from the high pressure (at the storage pipes 122) to low pressure (after passing through the J-T expander 132), which is required to obtain the internal gas chilling in the trans-shipment staging section 106 via the J-T cooling effect (described later).

In one embodiment, the Rich Gas mixture disclosed herein may be contained in the storage pipes 122 at pressures between about 3250 psig and about 3500 psig, depending on liquid fallout limits of the particular gas mixture, and preferably at ambient/ground temperatures. About 110° F. has been noted in modeling summer operations where limitations of air cooling and residence times in the pipeline have not proved to be prohibitive to in-pipe storage. In temperate zone winter conditions about 75° F. or lower is the norm for flow emerging from storage. This lower temperature is the basis for J-T chilling summarized for Standard Specification and Rich Gas mixes in FIGS. 3, 4 and 5.

An optional temperature trimming system is incorporated within or downstream of the storage compressors to condition the gas flow to optimal temperature or density conditions for process applications downstream of the invention. Where the pipeline is specifically designed to handle expansion, stress and material behavior, an operating condition, upper temperature limit of 150° F. is specified to maintain flow in gaseous state when the pipeline is installed in cold environments having high heat losses along the sectional length(s).

Storage where Other Facilities are Unavailable:

Such an accumulator storage system takes advantage of the available conventional pipeline installation equipment, techniques and inspection and quality control aspects implemented for the pipelines 112 in the pipeline staging section 102. For example, three (3) parallel 36" pipes can be used as the storage pipes 122 between the last compressor station 116 and the trans-shipment staging section 106. As a result, excessive costs or lack of onsite storage or caverns are no longer prohibitive at the destination or shipping point of the system 100. Thus, the storage staging section 104 ahead of the shipping point can now incorporate a large volume by means of pipes 122. Alternatively, the pipes 112 may be a mix of pipes of different lengths and/or diameters for holding this strategically determined volume.

The increased diameter(s)/cross-section(s) or combined diameter(s)/cross-section(s) of the storage pipes 122 in the storage staging section 104 further reduce the hydraulic pressure loss that may be experienced by the conventional pipeline system during normal operating conditions.

Storage Energy Chilling and Transposition:

As shown in FIG. 1, for trans-shipment, the natural gas mixture in the storage pipes 122 first passes through the molecular sieve/J-T expander 132 coupled downstream of the high pressure accumulator 122 to reduce the pressure thereof and to chill the natural gas mixture.

The J-T expander 132 reduces adiabatically the pressure of the natural gas mixture, or in one embodiment the rich gas mixture, from the high storage pressure (about 3250 to 3500 psig) to approximately 1300 psig. Such a pressure drop at the J-T expander 132 results in J-T cooling to the natural gas mixture passing therethrough for trans-shipment at optimal conditions illustrated in FIGS. 6A, 7A and 8A.

Using the energy in the high pressure accumulated Rich Gas mixture, the J-T expander acts as an internal chiller that, dependent on the destination demands, may be all the chilling that is required. The J-T expander 132 may be any gas expander and ancillary equipment suitable for reducing the pressure of the natural gas mixture and for chilling the natural gas mixture using the Joule-Thomson effect (i.e., internal, or self-chilling). For example, in one embodiment, the J-T expander 132 is a pressure reduction valve; in another embodiment and more efficiently, the J-T expander 132 is an energy recovering turbo expander. As is known in the art, the Joule-Thomson effect refers to the phenomenon that, with no heat exchange with the environment, the temperature of a gas changes when it is forced through a flow restrictor.

In one embodiment, the J-T expander 132 uses the J-T effect to chill the natural gas mixture to a low temperature suitable for trans-shipment without liquid fallout, e.g., in some embodiments to between about −20° F. and about −30° F. for Rich Gas Mixtures, or in other embodiments to between about −10° F. and about −80° F. for Standard Specification Gas. Whereas carbon steels are generally limited in service to −55° F., utilizing these lower temperatures is dependent upon the materials of construction with lower limits such as nickel steels, aluminum and stainless steel.

Figure 3:
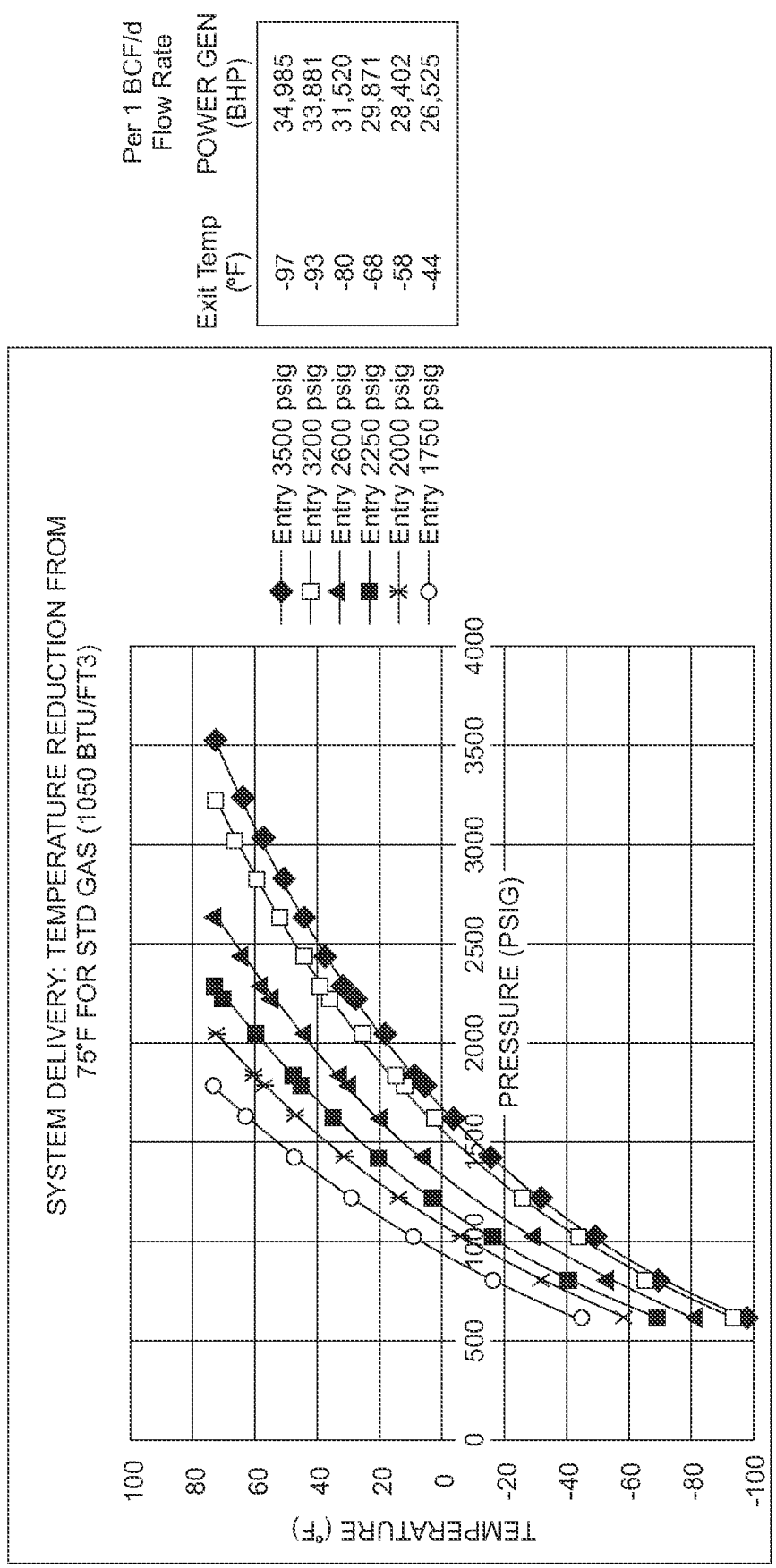
FIGS. 3 through 5 illustrate the chilling abilities available for downstream deliveries for three progressively richer gas mixtures containing a blend of constituents C1, C2, C3 . . . C6+. The mixtures are distinguished by HHV (high heat Values) in USBTU/ft3 units given in the title block of each of the Figures. We have full property behaviour reports including Phase Envelopes the charts illustrating the temperature drop for a rich gas mixture reduced in pressure for a variety of pressure ranges between about 1750 psig down to 600 psig, and 3500 psig down to about 600 psig.
Figure 4:
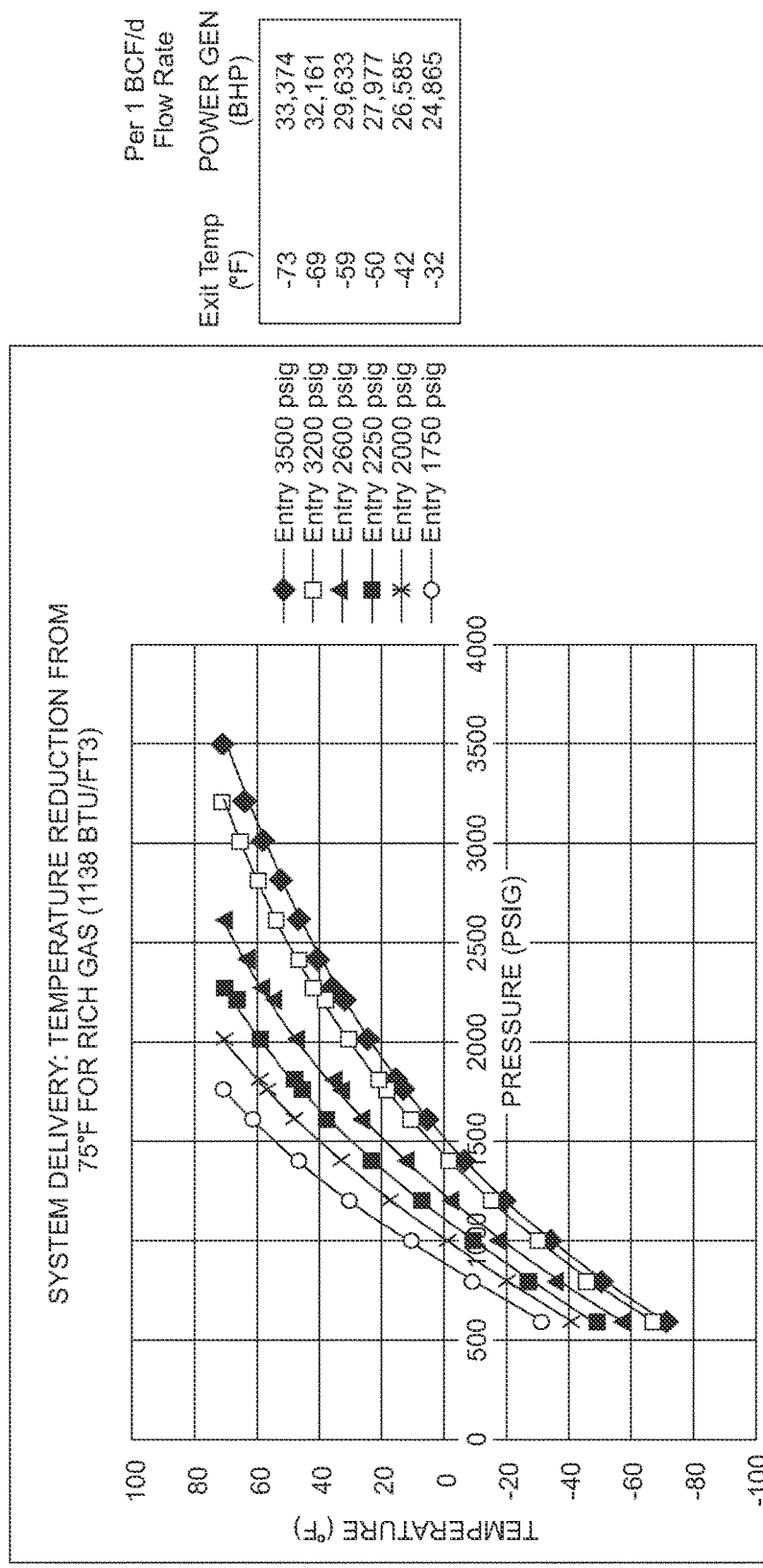
Figure 5:
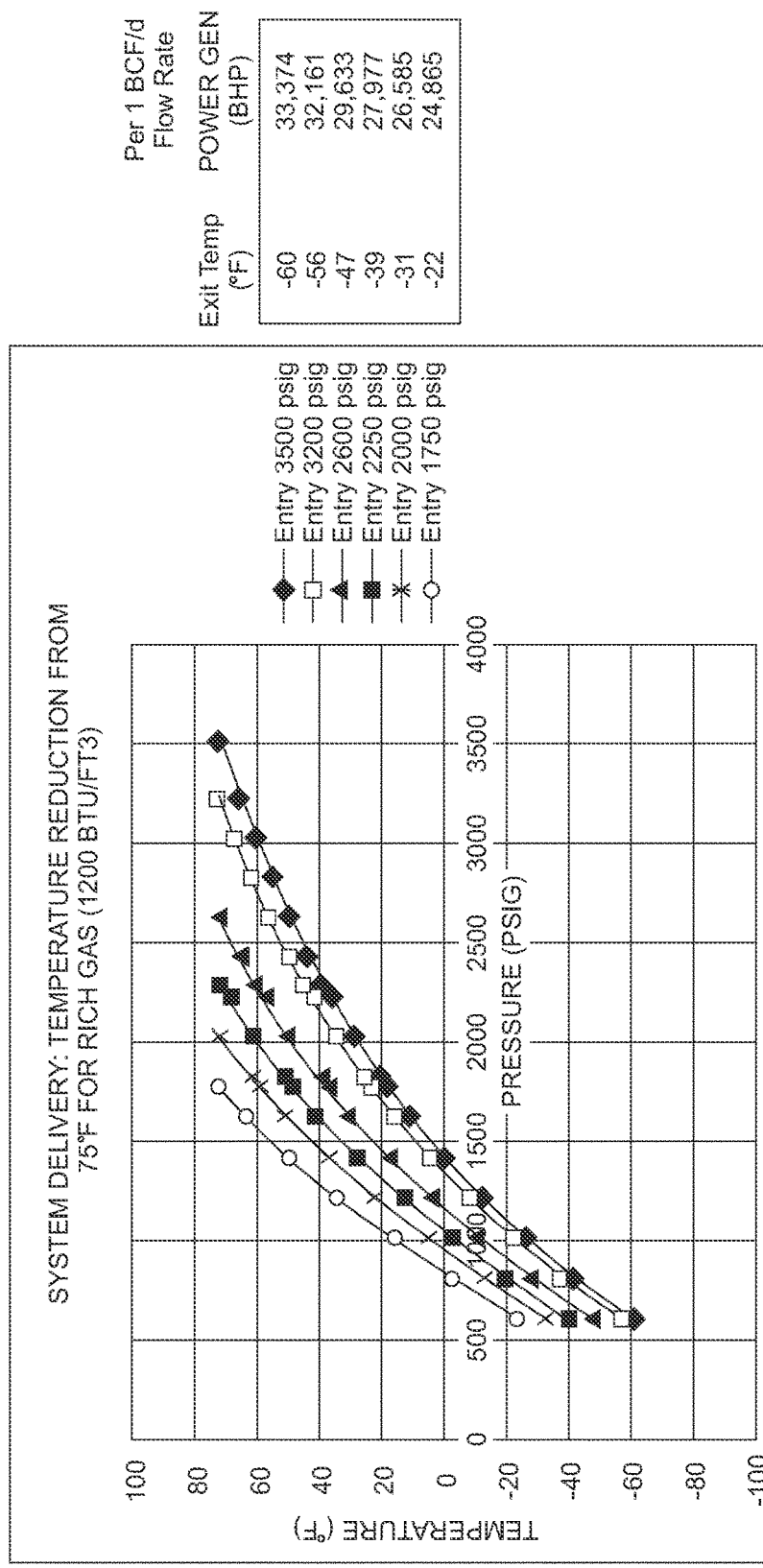

With reference to FIGS. 3, 4 and 5, rich gas mixtures at standard temperature 75 f will drop in temperature, when reduced in pressure from about 1750 to about 1200 psig to about 30 F, and when dropped from about 3500 psig to about 1200 psig, to about −30 F. The maximum temperature drop achieved flattens out for storage pressures of over about 3,000 psig, higher and higher starting pressures resulting in very little change in final temperate.

Energy Recovery as Electrical Generation:

In another embodiment where a turbo-expander is used for polytropic expansion, lower temperatures are achievable along with energy conservation by recovering energy through generation of electricity or mechanical power from its output shaft.

Recovered power from the turbo expander and chilled fluid emerging from the pipeline system present a more efficient means of providing external and downstream energy needs. The generated power can also exported off site.

Chilling to downstream processing production is provided more efficiently from pipeline compression. Given the additional External Chilling requirements for compression, heat transfer, fouling interface, and re-condensing the internal chilling availability from this invention will eliminate over half the expected energy load. In an embodiment, over a range of temperatures between 110 F and −40 F, internal chilling exhibits a nominal overall efficiency of general order of 28% compared to external chilling showing a general order of 12% overall efficiency.

Downstream Options:

Alternative pre-chilled feed stock can be provided from header 134 shown in FIG. 1 for a variety of process/transportation technologies that can benefit from reductions in chilled front end energy needs and lowered CO2 emissions when coupled with the pipeline system 100 in this manner. Typical but not exhaustive technologies applicable as downstream destinations for pre-chilled flow include separation and fractionation 142, CNG processing 144, NGL processing feedstock 146, first stage liquefied natural gas (LNG) processing 148, and compressed LNG for emerging market 150.

While located adjacent a terminus in one embodiment for J-T cooling, as shown in FIG. 1, the storage staging section 104 and the trans-shipment staging section 106 may be alternatively located at other locations such as intermediate locations or spur-lines anywhere along the pipeline 112.

In an alternative embodiment the storage pipes 122 can operate at a high pressure up to 4500 psig for increasing process storage density. At such high pressures the J-T effect on the contained Products is minimal, an external trimming cooler system is coupled to the J-T expander to reduce the discharged natural gas mixture to optimal temperature for colder temperature downstream applications.

In alternative embodiments, traditional Standard Transmission specification gas mixture may be transmitted in the disclosed high-pressure pipeline system 100. For example, in one embodiment, Standard Transmission specification gases may be transmitted in the high-pressure pipelines 112 operating between an MOP of about 2750 psig and recompression at 1650 psig or 1700 psig for transmitting the Standard Transmission specification gases at a low Z factor for improved gas transmission efficiency.

In an alternative embodiment, an external trimming cooler system can also be coupled to the J-T expander 132 to reduce the discharged natural gas mixture to optimal temperature or density conditions for alternate specified downstream applications.

Figure 6A:
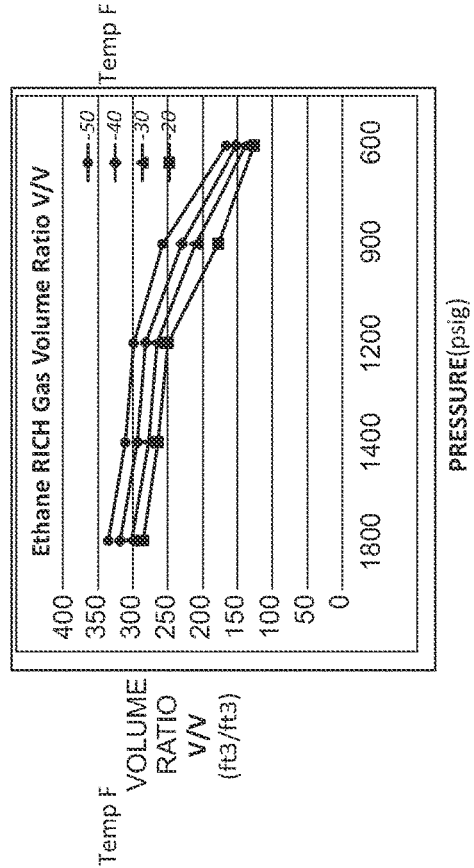
Figure 6A:
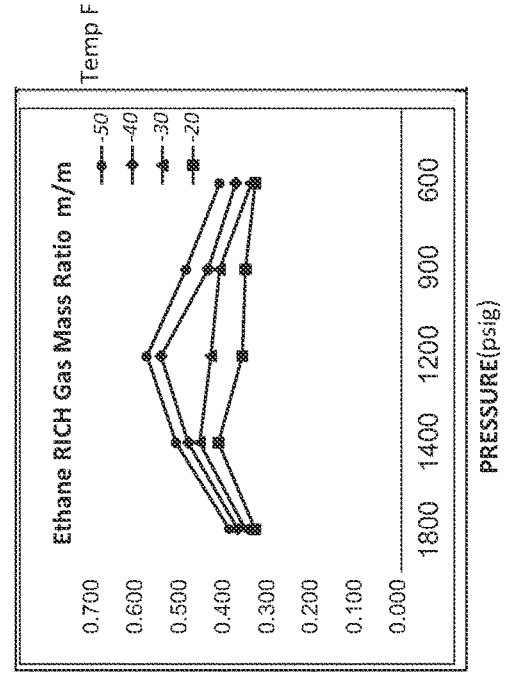
Figure 6A:
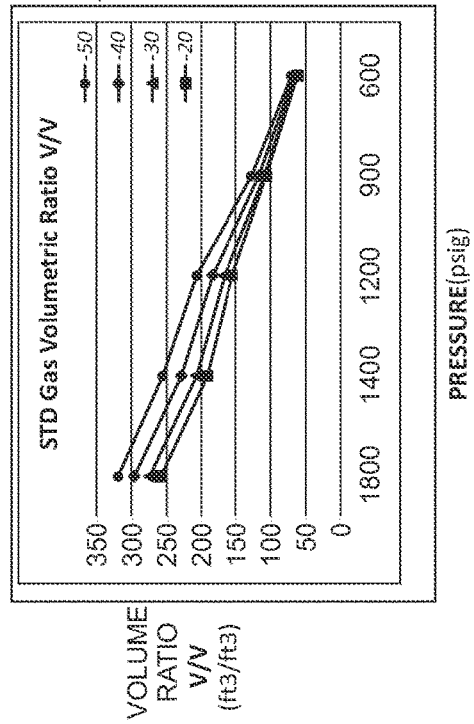
Figure 6A:
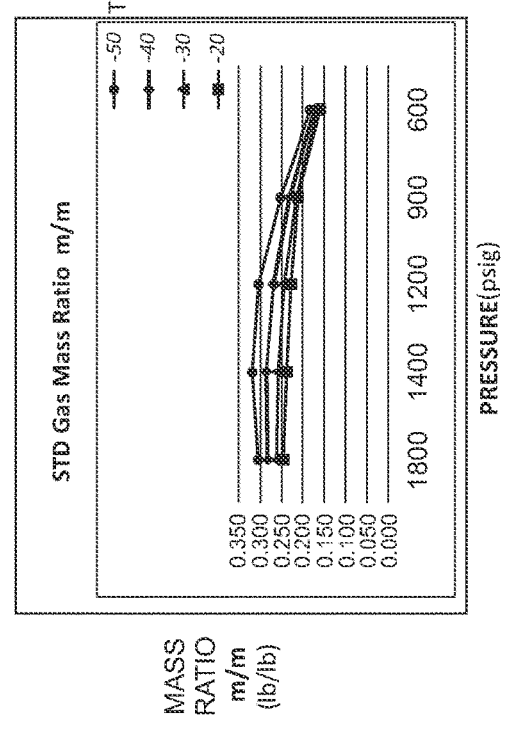
Figure 7A:
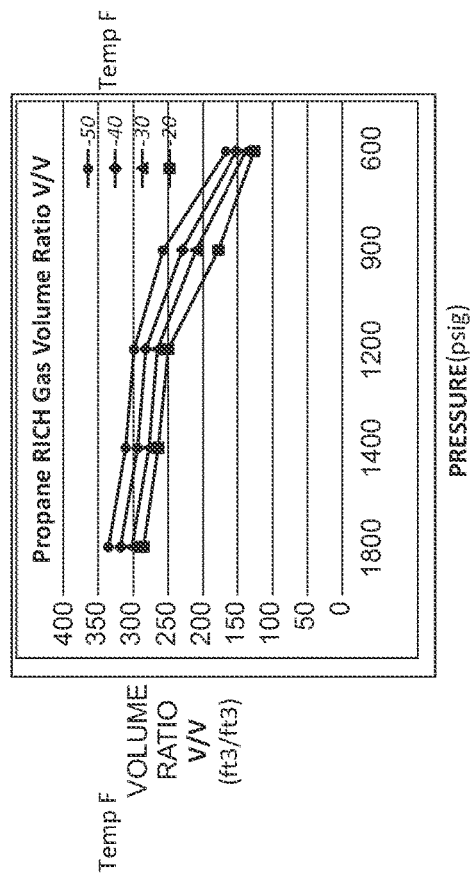
FIG. 7A shows storage characteristics of pipe containment propane-based rich gas mixtures, showing regions and limitations for optimal net volume ratio of propane-based mixtures compared to CNG volume ratios under same storage conditions, where comparable mass of gas to mass of containment steel pipe ratios are listed.
Figure 7A:
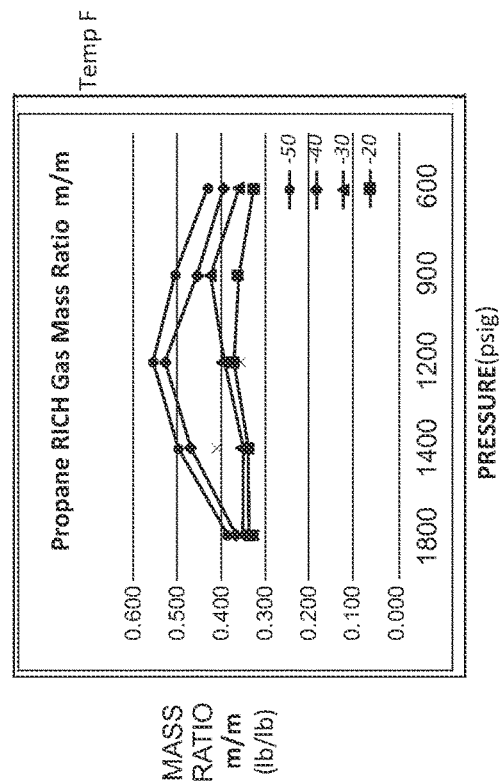
Figure 7A:
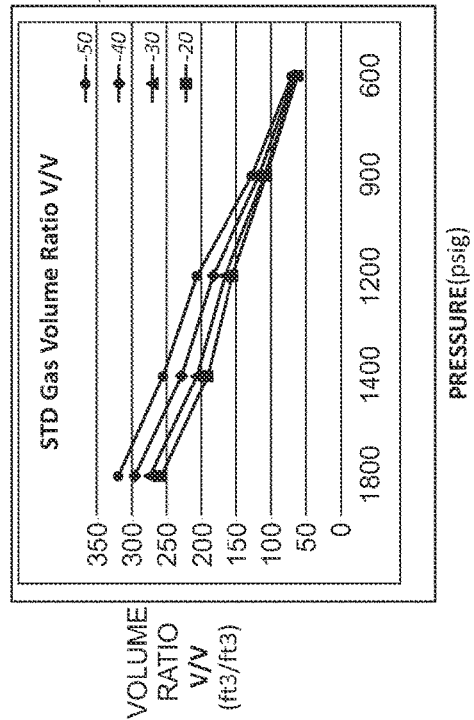
Figure 7A:
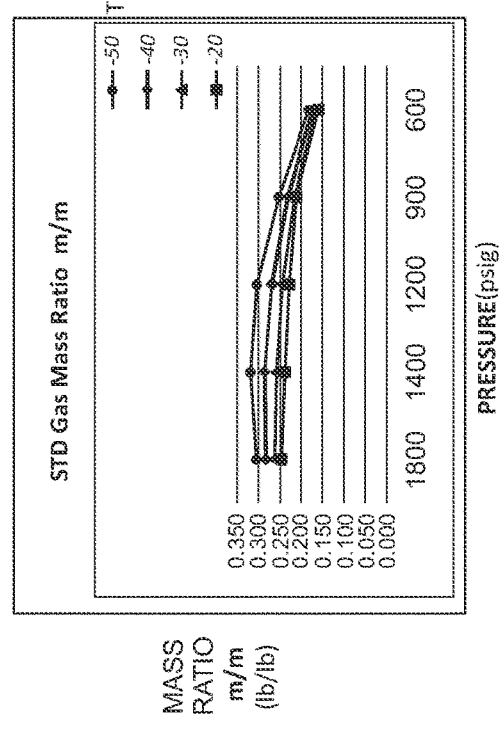
Figure 8A:
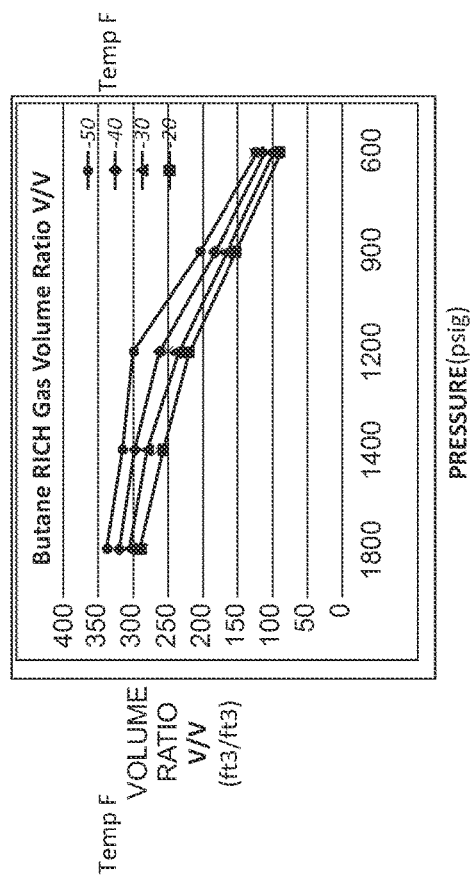
FIG. 8A shows storage characteristics of pipe containment butane-based rich gas mixtures, showing regions and limitations for optimal net volume ratio of butane-based mixtures compared to CNG volume ratios under same storage conditions, wherein comparable mass of gas to mass of containment steel pipe ratios are listed.
Figure 8A:
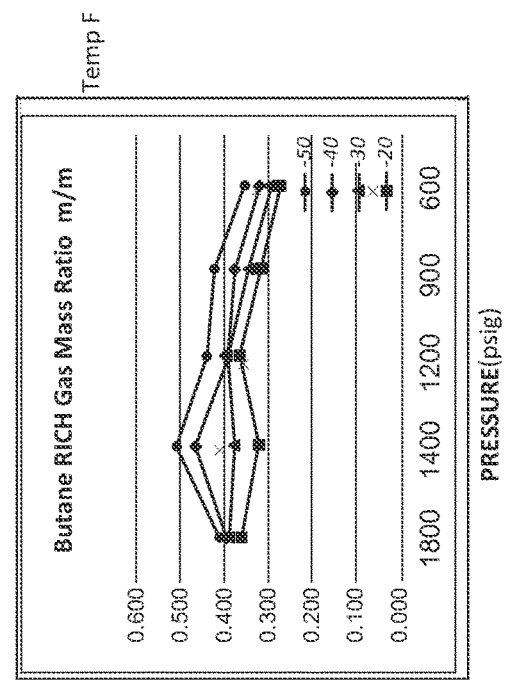
Figure 8A:
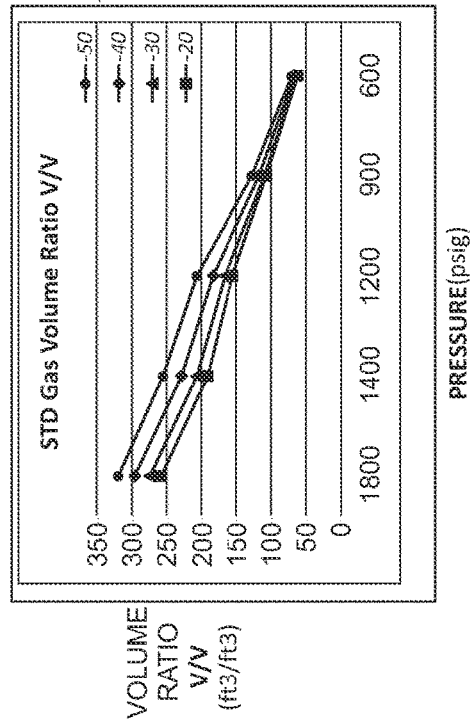
Figure 8A:
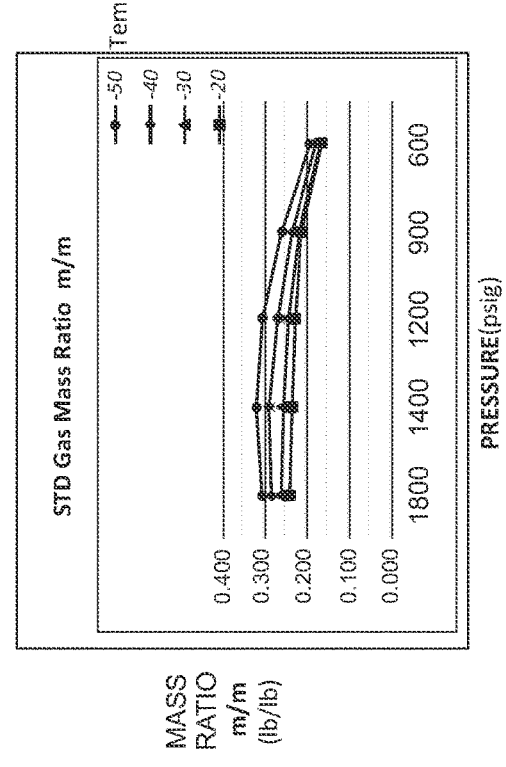

Influence of Gas Constituents Carried by Pipeline:

Given the multiplicity of combinations of affective NGL constituent combinations possible in Rich Gas mixtures it is convenient to illustrate the benefits and limitations of mixtures against Standard Transmission specification gas mixtures, modeled as straight methane (C1), and the Rich Gas modeled as 2-part mixtures of methane and each of one of the three common and principal NGL constituents of ethane (C2), propane (C3), and butane (C4) and modelling Standard Transmission specification gas as simple methane. FIGS. 6A, 7A and 8A show comparative values for the volumetric compression of the methane constituent in progressively richer mixes against Standard Transmission specification mixtures under the same conditions. Areas of best performance are shown as side-by-side graphs. As a commercial measure, one compares the mass of gas mixture to containment steel to show the effectiveness of this mode of storage.

Figure 6C:
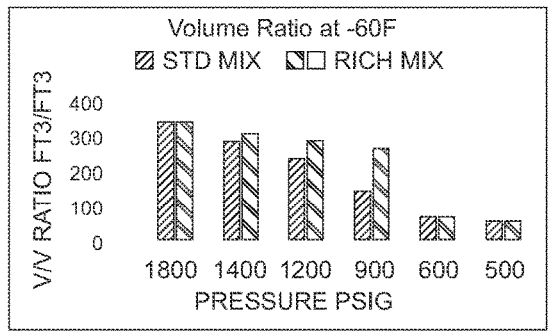
FIG. 6C further illustrates regions and limitations of the ethane-based rich gas of FIG. 6B for illustrating preferred VN and M/M ratios over those of standard transmission gas and limitations where rich gas mixtures could stray into the liquid phase.
Figure 6C:
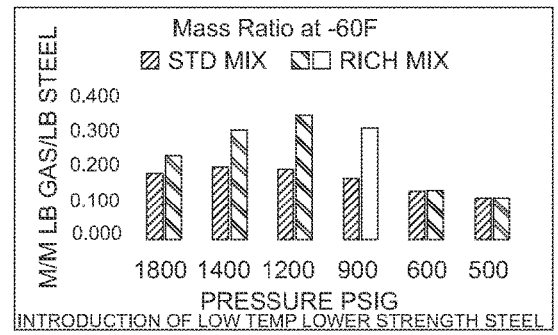
Figure 6C:
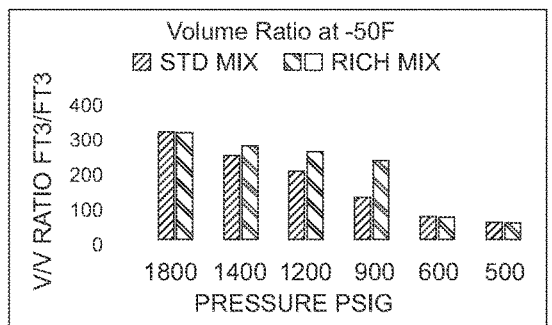
Figure 6C:
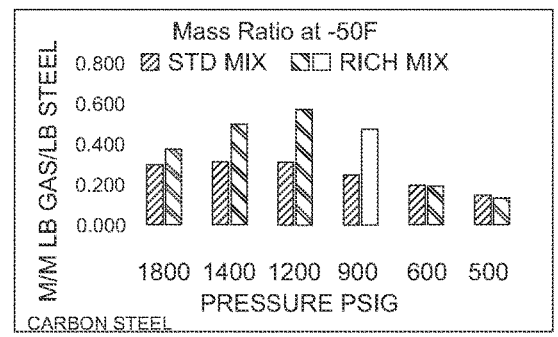
Figure 6C:
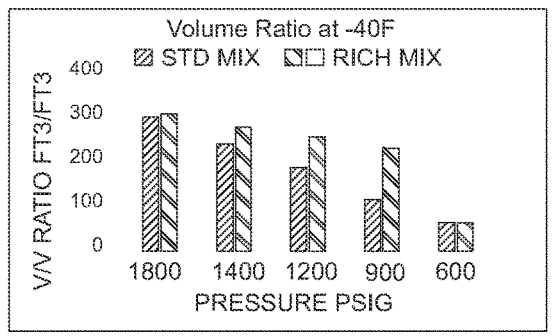
Figure 6C:
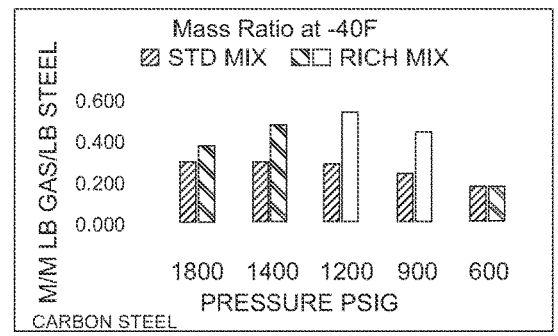
Figure 6C:
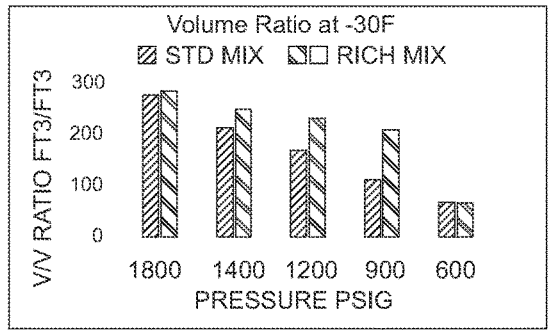
Figure 6C:
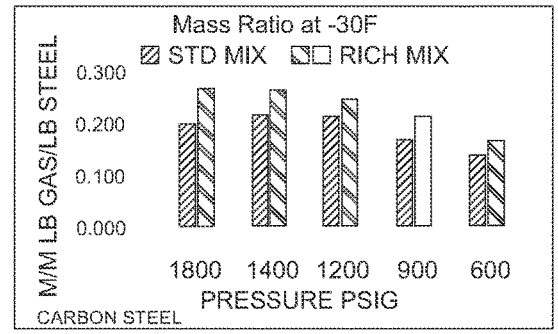
Figure 7C:
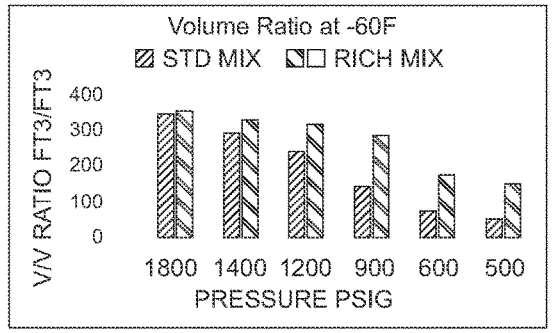
FIG. 7C further illustrates regions and limitations of the propane-based rich gas of FIG. 7B for illustrating preferred VN and M/M ratios over those of standard transmission gas and limitations where rich gas mixtures could stray into the liquid phase.
Figure 7C:
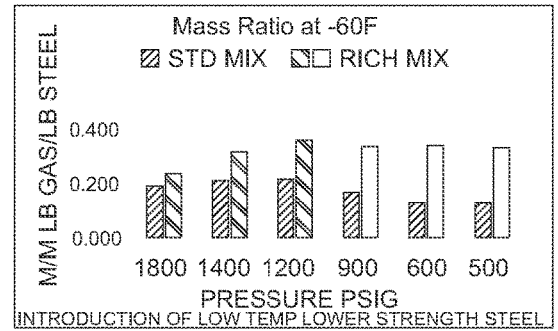
Figure 7C:
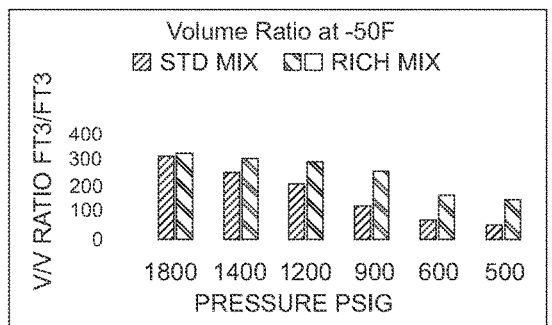
Figure 7C:
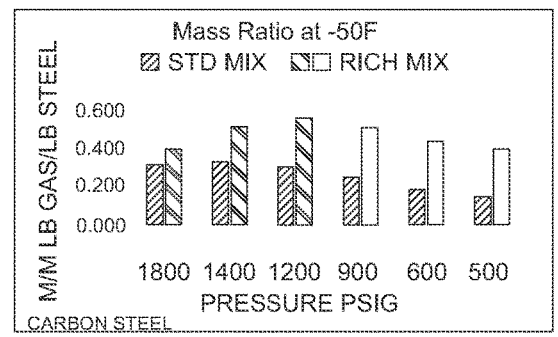
Figure 7C:
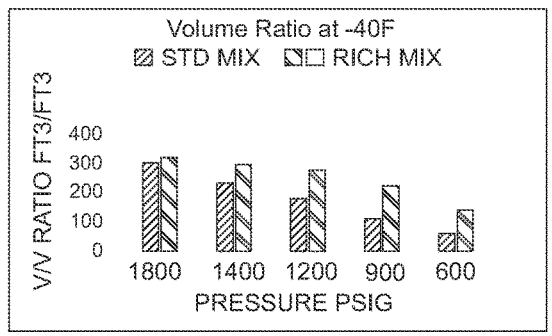
Figure 7C:
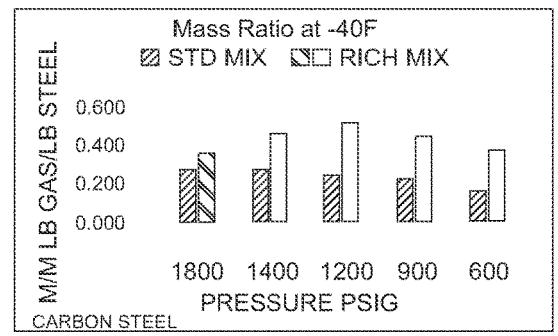
Figure 7C:
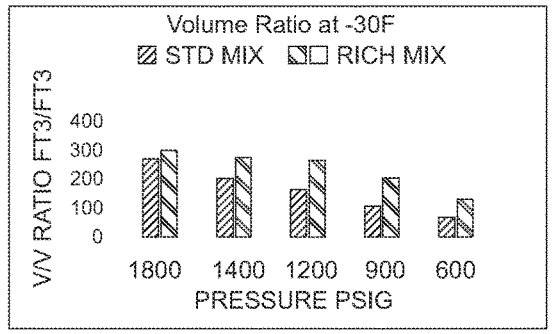
Figure 7C:
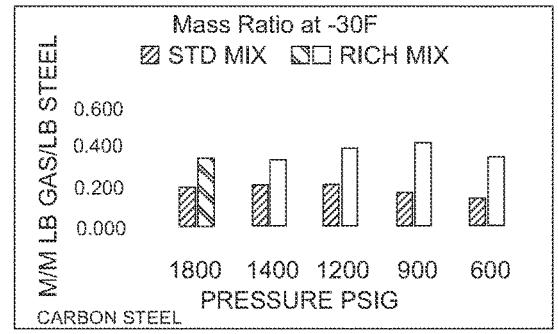
Figure 8C:
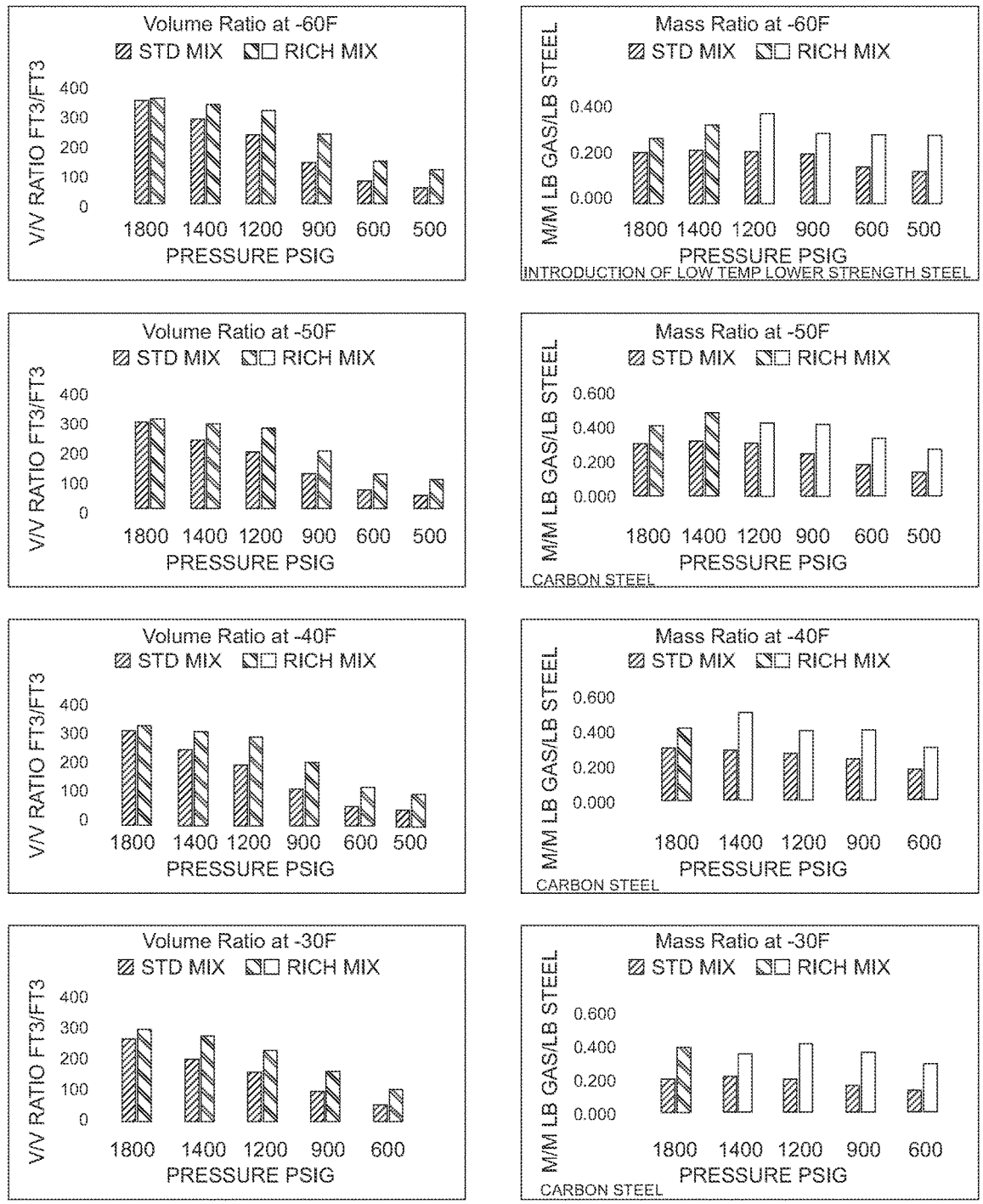

In the following, the benefits of the disclosed two-component Rich Gas mixtures are described with reference to FIGS. 6A to 8C. FIGS. 6A to 6C show the benefit of a Rich Gas mixture having ethane (C2) added as the compression constituent. FIGS. 7A to 7C show the benefit of a Rich Gas mixture having propane (C3) added and FIGS. 8A to 8C show the benefit of Rich gas mixture having butane (C4) added as the compression constituent.

In the graphs of FIGS. 6A, 7A and 8A, characteristics of Rich Mixes are shown in italic notation are where points of maximum content of methane (C1) occur at 2 Phase or Liquid States. Reduction in mol % of C1 at these points will change state to Gas phase and still yield higher values of VN and M/M than for Std Specification Gas under same Temperature and Pressure conditions—higher values will vary according to other constituents in real mixes.

In the FIG. 6A chart, performance for storage of the gaseous Rich Gas mixture (for the NGL constituent represented by ethane (C2), measured against the Standard Transmission specification mixture, appears in the 1100 to 1400 psig range of pressures at temperatures in the −30° F. to −20° F. window, balancing increased compressed volume ratio against mass ratio.

At a pressure of 1200 psig at temperatures of −40° F. and −30° F. the v/v ratio of the two mixtures show useful increases of the order of 35% for the Rich Gas over the Standard Transmission specification mixture.

There is a clear distinction between the two gas types in the comparative mass ratio plots. The useful value of 247 VN for the net volumetric ratio of Rich Gas at 1200 psig and −20° F. yields a lb/lb gas to containment material mass ratio of 0.40 exceeding the 0.22 number for CNG (from Standard Transmission specification gas mixture) under the same conditions. The mass ratio of the containment system for methane constituent in the Rich Gas is virtually doubled here over that for CNG when stored in this manner for onward transportation/storage in containment vessels, resulting in significant capital cost savings.

FIG. 7A shows the benefits in storage of Rich Gas mixtures (for the NGL constituent represented by propane (C3) over standard Standard Transmission specification/CNG mixes. The Rich Gas is modeled as a two component propane/methane mix, and net VN ratios are for the solo methane component, to make a comparison to the CNG case under the same storage conditions. Rich Gas mixture benefits are shown as mass of gas to mass of containment steel ratios on a lb/lb basis, especially important when high tonnage of materials are involved in storage vessels.

For propane rich constituents the best compressive performances for storage of the gaseous Rich Gas mixture measured against the Standard Transmission specification mixture appear in the 900 to 1400 psig range of pressures at temperatures in the −30° F. to −20° F. window suited to steel containment.

At a pressure of 1200 psig at temperatures of −30° F. and −20° F. the v/v ratio of the optimal mixtures show useful increases of the order of 69 to 60% for the Rich Gas. At colder temperatures, and higher pressures it is evident that instabilities of liquid formation and fallout is to be avoided for richer mixtures.

There is a clear distinction between the two gas types in the comparative mass ratio plots. The useful value of 250 for the volumetric ratio of Rich Gas at 1200 psig and −20° F. yields a lb/lb gas to containment material mass ratio of 0.38 exceeding the 0.22 number for CNG under the same conditions. The mass ratio of the required containment system is reduced to 2/3 here when Rich Gas is stored for transportation. Conversely similar containment performance of Standard Transmission specification mixture would call for that product to be stored at 1400 to 1800 psig at a temperature of −40° F. with a corresponding increase in wall thickness of the steel FIG. 8A shows the benefits in storage of Rich Gas mixtures (using C4) over standard CNG transmission mixtures. The rich gas is modeled as a two component butane/methane mixture, and net VN ratios are for the methane component only to make a comparison to the CNG case under the same storage conditions. Rich gas mixture benefits are shown as mass of gas to mass of containment steel ratios on a lb/lb basis, especially important when high tonnage of materials are involved in storage vessels.

Best compressive performances for storage of the gaseous Rich Gas mixture measured against the Standard Transmission specification mixture appear in the 900 to 1200 psig range of pressures at temperatures in the −30° F. to −20° F. window suited to steel containment.

At a pressure of 1200 psig at temperatures of −30° F. and −20° F. the v/v ratio of the two mixtures show useful increases of the order of to 45% for the Rich Gas over Standard Transmission specification mixture. At colder temperatures, and higher pressures it is evident that instabilities of liquid formation and fallout is to be avoided for richer mixtures.

There is a clear distinction between the two gas types in the comparative mass ratio plots. The useful value of 229 for the volumetric ratio of Rich Gas at 1200 psig and −20° F. yields a lb/lb gas to containment material mass ratio of 0.37 exceeding the 0.22 number for CNG under the same conditions. The mass ratio of the containment system is less than 2/3 here when Rich Gas is stored for transportation. Conversely similar containment performance of Standard Transmission specification mixture would call for that product to be stored at 1400 to 1800 psig at a temperature of −40° F.

With reference to the graphs of FIGS. 6C, 7C and 8C, each graph illustrates gas property trends for primary NGL constituents. Each graph illustrates the maximum gas storage values of rich gas-vs-std specification gas for gases enriched with ethane, propane and butane respectively. Of the rich mix gases, higher m/m values are shown in grey tone and are subject to moderate reduction in peak NGL concentration to avoid two-phase or liquid state storage conditions. The Y-axis represents VN, being (Volume of Natural Gas at Std. Conditions)/(Volume of Natural Gas at Storage Conditions). The corresponding Y-axis M/M=Gross Mass of Contained Mixture/Mass of steel in Containment System. Further, for the volume ratios VN, the contained natural gas in Rich Gas Mix is net value of natural gas component within the Mix.

Performance for storage of the gaseous Rich Gas mixture (for the NGL constituent represented by ethane (C2), measured against the Standard Transmission specification mixture, appears in the 1100 to 1400 psig range of pressures at temperatures in the −30° F. to −20° F. window, balancing increased compressed volume ratio against mass ratio.

At a pressure of 1200 psig at temperatures of −40° F. and −30° F. the v/v ratio of the two mixtures show useful increases of the order of 35% for the Rich Gas over the Standard Transmission specification mixture.

There is a clear distinction between the two gas types in the comparative mass ratio plots. The useful value of 247 VN for the net volumetric ratio of Rich Gas at 1200 psig and −20° F. yields a lb/lb gas to containment material mass ratio of 0.40 exceeding the 0.22 number for CNG (from Standard Transmission specification gas mixture) under the same conditions. The mass ratio of the containment system for methane constituent in the Rich Gas is virtually doubled here over that for CNG when stored in this manner for onward transportation/storage in containment vessels, resulting in significant capital cost savings.

FIG. 6B shows tables for the derivation of graphics used in FIG. 6A. In particular the ratio of m/m mass ratio numbers for Rich Gas mixtures alongside those for the standard gas/CNG mixture, should be noted as confirming industry teaching with one caveat—this being that for Rich Gas mixtures, the various states of storage can be achieved from the dense phase state by controlled pressure and temperature reduction from the pipeline without the need for the more complex compression and cooling infrastructure common to single phase CNG storage configurations. Rich Gas mixtures offer 50% or better Mass Ratio figures for storage of the methane constituent (essentially Standard Transmission specification gas) under selected conditions of storage than is attainable from Standard Transmission Specification mixtures under these moderate levels of pressure and temperature.

FIG. 6C shows clearly where Rich Gas mixtures are superior to Standard Transmission specification mixtures under storage conditions and where the technology must respect the onset of undesirable liquid phase above certain concentrations of the NGL constituent.

FIG. 7A shows the benefits in storage of Rich Gas mixtures (for the NGL constituent represented by propane (C3) over Standard Transmission specification/CNG mixes. The Rich Gas is modeled as a two component propane/methane mix, and net VN ratios are for the solo methane component, to make a comparison to the CNG case under the same storage conditions.

In FIG. 7B Rich Gas mixture benefits are shown as mass of gas to mass of containment steel ratios on a lb/lb basis, especially important when high tonnage of materials are involved in storage vessels.

Best compressive performances for storage of the gaseous Rich Gas mixture measured against the Standard Transmission specification mixture appear in the 900 to 1400 psig range of pressures at temperatures in the −30° F. to −20° F. window suited to steel containment.

At a pressure of 1200 psig at temperatures of −30° F. and −20° F. the v/v ratio of the optimal mixtures show useful increases of the order of 69 to 60% for the Rich Gas. At colder temperatures, and higher pressures it is evident that instabilities of liquid formation and fallout is to be avoided for richer mixtures.

There is a clear distinction between the two gas types in the comparative mass ratio plots. The useful value of 250 for the volumetric ratio of Rich Gas at 1200 psig and −20° F. yields a lb/lb gas to containment material mass ratio of 0.38 exceeding the 0.22 number for CNG under the same conditions. The mass ratio of the required containment system is reduced to 2/3 here when Rich Gas is stored for transportation. Conversely similar containment performance of Standard Transmission specification mixture would call for that product to be stored at 1400 to 1800 psig at a temperature of −40° F. with a corresponding increase in wall thickness of the steel FIG. 7C shows clearly where Rich Gas mixtures are superior to Standard Transmission specification mixtures under storage conditions and where the technology must respect the onset of the liquid phase.

FIG. 8A shows the benefits in storage of Rich Gas mixtures using butane (C4) over standard CNG transmission mixtures.

In FIG. 8B Rich gas mixture benefits are shown as mass of gas to mass of containment steel ratios on a lb/lb basis, especially important when high tonnage of materials are involved in storage vessels.

Best compressive performances for storage of the gaseous Rich Gas mixture measured against the Standard Transmission specification mixture appear in the 900 to 1200 psig range of pressures at temperatures in the −30° F. to −20° F. window suited to steel containment.

At a pressure of 1200 psig at temperatures of −30° F. and −20° F. the v/v ratio of the two mixtures show useful increases of the order of to 45% for the Rich Gas over Standard Transmission specification mixture. At colder temperatures, and higher pressures it is evident that instabilities of liquid formation and fallout is to be avoided for richer mixtures.

There is a clear distinction between the two gas types in the comparative mass ratio plots. The useful value of 229 for the volumetric ratio of Rich Gas at 1200 psig and −20° F. yields a lb/lb gas to containment material mass ratio of 0.37 exceeding the 0.22 number for CNG under the same conditions. The mass ratio of the containment system is less than 2/3 here when Rich Gas is stored for transportation. Conversely similar containment performance of Standard Transmission specification mixture would call for that product to be stored at 1400 to 1800 psig at a temperature of −40° F.

FIG. 8C shows clearly where Rich Gas mixtures are superior to Standard Transmission specification gas/CNG mixtures under these storage conditions and where the technology must respect the onset of undesirable liquid phase.

FIG. 9A shows a comparison between a conventional pipeline system and the high pressure transmission system 200 disclosed herein. As shown, the conventional pipeline system (column 102) is operated at a pressure of about 1440 psig, transmitting a Standard Transmission gas mixture with Molecular Weight (MW) of 16.75. On the other hand, the high pressure transmission system 200 (column 202) is operated at a pressure of about 2250 psig, transmitting a rich gas mixture with Molecular Weight (MW) of 19.93.

Based on an upper limit of inlet flow of one billion ft3/day, and operating at an MOP of 1440 psig, for 1000 miles of transmission, the conventional pipeline system requires a mass of steel of about 463,913 US tons, and the Rich Gas high pressure pipeline of smaller diameter, system 200, requires a mass of steel of about 499,799 US tons. Although the design of the Rich Gas system 200 requires fractionally more mass of steel, it achieves higher daily heat value delivery per US ton steel (2.411 million BTU/US Ton Steel vs. 2.217 million BTU/US Ton Steel). The smaller diameter of system 200 is not restricted to the comparative inlet flow rate of 1.0 billion ft3/day used here for comparative purposes and can achieve a still higher daily heat value delivery per US ton steel. In system 201, which is essentially system 200 subjected to a higher flow rate and velocity restrictions, the delivered heat value ratio is seen to increase by the order of +30%, depending a higher flow rate and velocity limitations). See system 201.

Further, FIG. 9A also shows that the compressor stations of system 200 also require less power than those of the conventional system 100 to deliver the set volume of gas at the rate of 1.0 bcf/d. The move to a higher flow rate of system 300 shows a prorated increase in overall compressor power and CO2 emissions over that of the lower pressure system 100.

FIG. 9B shows a selection of values of the enthalpies of vaporization of CFC refrigerants for external chilling and those of NGLs operating from an initial temperature of 80° F. It will be noted that the efficacy of NGLs are comparable alongside the more typical R21 CFC refrigerant, which is amongst those being withdrawn from the market out of environmental concerns of damage to the ozone layer of the atmosphere. Given the chilling ability of constituent hydrocarbons in a Rich Gas mixture, and the elevated levels of storage, the opportunity exist here for those skilled in the art to design the delivery of chilled product as the gas exits the pipeline beyond those promised for Standard Specification gas mixtures. In other contexts where less emphasis is placed on storage and hydraulics a system could be designed to achieve greater temperature reductions for Standard Specification gas mixtures, in particular the retrofit of existing LNG systems.

Figure 9C:
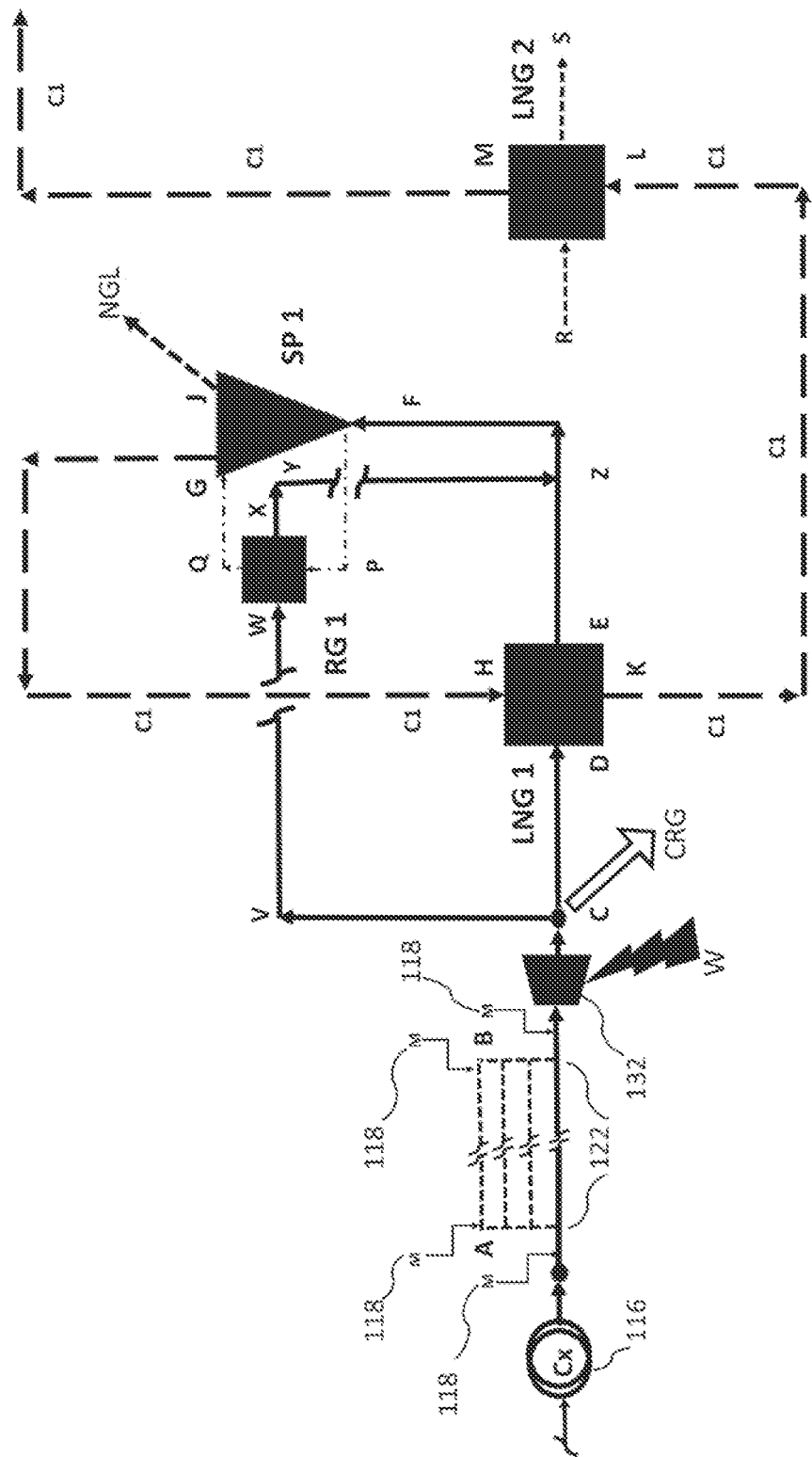
FIG. 9C is a schematic illustrating the replacement of a first stage propane section of a cascaded propane-ethylene-methane process for LNG production, external chilling at the first stage of an LNG plant being replaced by an internally chilled mixture emerging from the pipeline. The Rich Gas pipeline flow is separated into an NGL stream and a lean gas feedstock for the LNG process.

FIG. 9C shows the replacement of the first stage propane section of a cascaded propane-ethylene-methane process for LNG production. The cold gas is first used to provide maximum temperature differential to the LNG process prior to becoming feedstock for an NGL separation plant. Methane and residual ethane from this separation plant is then introduced back as feedstock into the LNG process.

The gas stream leaves the pipeline/storage system via the turbo expander 132 that both chills the gas as its pressure drops and generates shaft power that can be converted into electricity W. The flowrate is monitored at a custody transfer point C. An opportunity exists here downstream of custody transfer to ship an optional side-stream C-R-G of compressed Chilled Rich Gas to an export point ahead of LNG processing. An opportunity here also exists for an auxiliary process chilling flow C-V of product to be withdrawn.

The main pipeline delivery flow destined for the LNG plant passes into the first stage chiller LNG1 at point D where all or most of the chilling normally supplied by a propane refrigeration plant is replaced by the pipeline outflow. This unit chills the LNG plant feedstock passing through the heat exchanger from point H to point K.

From Point E the flow goes to Point F where it enters a separation tower SP1 where NGL liquids are extracted (departing the tower at Point J) leaving behind a lean gas stream of mostly methane and some ethane that forms the basis of the LNG feedstock. This product flows from point G to the inlet of the first stage chiller LNG 1 at point H. It will generally not require any intermediate processing with correct operation of the separation tower SP1 that is ideally specified as an absorbent process.

From chiller LNG1 the LNG feedstock enters a second stage chilling process LNG 2 at Point L. This chiller uses a refrigerant such as ethylene outside of the temperature range and scope of this invention onroute to the LNG production of the plant.

The separation unit SP1 has a loop for regeneration of adsorbent fluid through a process skid RG1. The previously mentioned chilled side-stream of pipeline outflow of cold rich gas CV is used in the chiller section of this skid. The chilling stream enters the RG1 unit at W, leaving at X to rejoin intercept at point V and reunite with the mainstream flow EF emerging from the Chiller LNG 1.

This disclosure discusses a method of accelerating the onset of, and access to, lower compressibility (Z) factors in natural gas pipelines covering embodiments of broader pressure, temperature, and constituents within Rich Gas mixtures yielding a new array of transportation benefits. A wider band of low flow resistance in pipelines over that in the prior art which restricted by lower maximum operating pressures. Storage density is improved. The properties of the Rich Gas mixtures and higher operating/storage pressures involved are such that internal chilling within the transported medium can then take place through the Joule-Thompson effect and making a chilled, lower pressure delivery of product direct from the pipeline.

The subsequent delivery of a chilled product using recovered pipeline energy can replace a substantial amount of chilling otherwise externally created for many downstream applications.

The ability to take advantage of high levels of NGLs within the new gas mixtures and their behavior within the broader pipeline pressure differentials (sitting within 3500 psig and 900 psig) for this invention enables the Joule-Thompson effect of "internal" chilling to occur within the product transported by the pipeline. This chilling matches or exceeds that of external chilling via heat exchangers commonly found in the downstream gas processing industry to be working below 800 psig and 1300 psig plant design thresholds. These industrial refrigerants here are frequently non-hydrocarbon in nature and increasingly being withdrawn from the market in the interests of their more severe environmental impact.

Having a pre-chilled product delivered by the pipeline will alleviate this demand on the industry, and when provided via turbo expander recover pipeline energy often lost in the custody transfer between segregated pipeline and process disciplines.

Design developments incorporated herein permit simplified operations within a broader pressure range of low compressibility factor (Z) operation to take place. Preconditioning processing in the field is simplified, mainline compressor stations can incorporate single units. Operating pressures now broaden between 2500 psig through the best efficiency point around 2100 psig to the recompression point about 1300 psig or about 1450 psig, depending on gas mixture.

On a project specific basis there is nothing to preclude design and construction of all sections of the pipeline to a high MOP of 3500 psig encompassing hydraulic, storage and chilling benefits claimed by this invention throughout its length.

Reduced capital expenditure, compression infrastructure and operating costs emerge from this less energy and emissions intensive Rich Gas transmission, chilling and containment system. The need and environmental impact of multiple pipelines, rail and trucking movements for gas and NGL transport is eliminated or takes place through seamless integration of new process plant and retrofitting of existing infrastructure to meet future demands on the industry.

As a result and enabled herein, embodiments include a method of bringing about the chilling of Natural Gas and Natural Gas/NGL mixtures delivered from a pipeline system such that the resulting mixture also exhibits internal chilling behavior during its transport, storage, and withdrawal from the system that is associated with behavior properties of the constituents of the conveyed product. Such mixtures can be formulated by additive or subtractive processing of the natural gas and NGL constituents. Operational conditions where these effects occur can be between 3500 psig and 500 psig and 120 F and −120 F. The low temperature range being reserved for the lightest mixtures not exhibiting liquid fall out.

The method replaces or reduces the need for externally provided chilling traditionally applied in downstream processing of the delivered products. Notwithstanding the types of process here include but are not limited to pre chilling for LNG production, chilling for separation and fractionation, and chilling for enhanced storage of CNG.

In another aspect, a method of high pressure pipeline transmission and systems of storage for Natural Gas mixtures and Natural Gas/NGL enhanced mixtures is provided, the mixtures formulated with the objective of lowering compressibility (Z) factors under Maximum Operating conditions (MOP) between above about 2150 psig and up to about 4500 psig. Such mixtures can be formulated by additive or subtractive processing of the natural gas and NGL constituents.

In an example of the range of effective gas mixtures applicable comprise: from 40% to 98% by mol volume of methane, from trace to 35% by mol volume of ethane; from trace to 22% by mol volume of propane; from trace to 9% by mol volume of butane; residual amounts of N2 not exceeding 2% by mol volume; trace elements of C5+ (ie C5, C6 . . . ) hydrocarbons not exceeding 0.25% of mol volume; and the total being 100%, wherein the operating conditions of the mixture is completely gaseous or in the supercritical-dense phases with no liquid phase.

Notwithstanding, the mol % of any of the Light Hydrocarbons (ethane, propane, butane) given here can also lie within the 0 to specified minimum % mol range as shown, where the stand alone % mol of remaining Light Hydrocarbons is sufficient to bring about the reduction in Z factor value and dense phase flow/storage behavior and/or chilling effects.

Such stand alone values are 6% for ethane, 1.5% for propane and 0.5% for butanes for Rich Gas mixtures: and 2% for ethane, 1% for propane and 0.25% for butanes in the 2500 psig or higher pressure Standard Transmission specification mixtures.

Turning to the storage aspect, a high pressure staged section of the pipeline, that is project specific in volume by virtue of length and cross sectional area, can be used for high pressure storage, product flow and de-pressuring of the pipeline contents, which operates within the limits of 3500 psig and 800 psig according to end use for the delivered product. Such as system can also be operated within the limits of 4500 psig and 800 psig according to end use for the delivered product.

Regarding the internal chilled through Joule Thompson effect, a pressure and temperature reducing device such as a J-T valve or Turbo Expander is located at the exit points of the pipe sections that will bring about the refrigeration effect within the transmitted gas mixture subjected to the pressure drop. Preferably a turbo expander system is employed that permits shaft or electrical recovery of pipeline energy from the high pressure storage. Despite the chilled effects achieved using embodiments described herein, and where internal chilling is insufficient, an optional temperature trimming system incorporated within or downstream of the storage compressors to condition the gas flow to optimal temperature or density conditions for process applications downstream of the invention.

In embodiments where the pipeline is specifically designed to handle expansion, stress and material behavior, an upper temperature limit of 150 F is claimed for operating conditions to maintain flow in gaseous state when the pipeline is installed in cold environments with high heat losses along the sectional length(s).

A pipeline can be configured to carry lean North American Spec Gas or NGL Rich Gas, that is project specific in volume, by virtue of its entire length and cross sectional area and pipe layout, used for product flow, high pressure storage, and de-pressuring the contents, which operates within the limits of 4500 psig and 350 psig according to end use for a chilled delivered product.

We claim:

1. A method for producing chilled standard specification and rich gas specification natural gas mixtures within a pipeline system for downstream applications comprising the steps of:
    (a) compressing a natural gas mixture received from a natural gas pipeline to a pressure range of between 2500 psig and 4500 psig to produce a compressed gas mixture;
    (b) storing a volume of the compressed gas mixture in a supercritical state at a pre-expansion pressure range of between 2500 psig and 4500 psig and at a relatively constant temperature;
    (c) expanding the compressed gas mixture using an expansion chilling device in the form of a J-T valve or a turbo expander positioned at a terminus of the pipeline to achieve (i) reduction in pressure to a range of between 600 psig and 1200 psig, and (ii) self chilling through the Joule-Thomson effect to a temperature range of between minus 20° F. to minus 100° F., thereby producing a chilled gas mixture comprising methane, methane and trace ethane, or methane and natural gas liquid, wherein the compressed gas mixture is not externally chilled via a heat exchanger;
    (d) injecting NGLs or make up methane gas into the pipeline during compression, storage, and/or after expansion to adjust the compressed or chilled gas mixture therein so as to avoid instability of undesirable liquid formation and fallout;
    (e) delivering the chilled gas mixture having a pressure of between 600 and 1200 psig and a temperature between minus 20° F. to minus 100° F. from the pipeline system to a downstream destination; and
    (f) further liquefying the chilled gas mixture by a liquefied natural gas processing step, or by separation and fractionation.

2. The method of claim 1 wherein the natural gas mixture received from the natural gas pipeline has a pressure of over 2250 psig.

3. The method of claim 1 wherein the pre-expansion pressure range is between 2500 psig and 3250 psig.

4. The method of claim 1 further comprising, before step (a), the step of transmitting the natural gas mixture along the natural gas pipeline with recompression beginning at 1300 psig or greater to a pressure of up to about 2500 psig.

5. The method of claim 1 wherein the chilled gas mixture has a temperature of between minus 60° F. and minus 100° F.

6. The method of claim 1 wherein the turbo expander is coupled for energy recovery through an output shaft to a mechanical device.

7. The method of claim 1 wherein the turbo expander is coupled for energy recovery through an output shaft to an electrical generation device.

8. The method of claim 1 wherein the turbo expander is coupled for energy recovery through an output shaft used directly for upstream or downstream compression.

9. The method of claim 1 wherein the natural gas mixture from the pipeline comprises the following constituents:
   from 40% to 98% by mol volume of methane;
   from trace to 35% by mol volume of ethane;
   from trace to 22% by mol volume of propane;
   from trace to 9% by mol volume of butane;
   residual amounts of total N2 not exceeding 2% by mol volume;
   C5+ hydrocarbons not exceeding 0.25 of mol volume;
   the total volume of these constituents being 100%.

10. The method of claim 1 wherein the natural gas mixture from the pipeline comprises the following constituents:
    from 55% to 94% by mol volume of methane;
    from 6 to 25% by mol volume of ethane;
    from trace to 22% by mol volume of propane;
    from trace to 8.5% by mol volume of butane;
    residual amounts of N2 not exceeding 2% by mol volume;
    C5+ hydrocarbons not exceeding 0.25% of mol volume;
    the total volume of these constituents being 100%.

11. The method of claim 1 wherein the chilled gas mixture has a pressure of between about 1,200 to about 600 psig.

12. The method of claim 1 wherein, the chilled gas mixture has a pressure of greater than about 600 psig.

\* \* \* \* \*